United States Patent [19]
Chen et al.

[11] Patent Number: 5,848,260
[45] Date of Patent: Dec. 8, 1998

[54] COMPUTER SYSTEM FOR SIMULATING PHYSICAL PROCESSES

[75] Inventors: Hudong Chen, Waltham; David Lawerence Hill, Somerville; James Hoch, Harvard; Kim Molvig, Concord; Christopher M. Teixeira, Cambridge; Kenneth R. Traub, Watertown, all of Mass.

[73] Assignee: Exa Corporation, Lexington, Mass.

[21] Appl. No.: 566,032

[22] Filed: Dec. 1, 1995

Related U.S. Application Data

[63] Continuation-in-part of Ser. No. 165,293, Dec. 10, 1993, Pat. No. 5,594,671.

[51] Int. Cl.⁶ .............................. G06F 19/00; G06F 15/60
[52] U.S. Cl. ........................... 395/500; 364/578; 364/378
[58] Field of Search .............................. 395/500, 50, 124, 395/119, 120, 121, 123, 127, 128; 364/578, 413.18

[56] References Cited

U.S. PATENT DOCUMENTS

| | | | |
|---|---|---|---|
| 4,498,134 | 2/1985 | Hansen et al. | 395/800 |
| 4,507,726 | 3/1985 | Grinberg et al. | 395/800 |
| 4,729,098 | 3/1988 | Cline et al. | 364/413.18 |
| 4,809,202 | 2/1989 | Wolfram | 364/578 |
| 4,831,519 | 5/1989 | Morton | 395/307 |
| 4,860,245 | 8/1989 | Kinoshita | 364/800 |
| 4,933,895 | 6/1990 | Grinberg et al. | 364/748 |
| 4,969,116 | 11/1990 | Wada et al. | 364/578 |
| 4,989,166 | 1/1991 | Akasaka et al. | 364/578 |
| 5,038,302 | 8/1991 | Kaufman | 395/124 |
| 5,159,690 | 10/1992 | Margolus | 395/800 |
| 5,255,212 | 10/1993 | Kondoh et al. | 364/578 |
| 5,361,385 | 11/1994 | Bakalash | 395/124 |
| 5,377,129 | 12/1994 | Molvig et al. | 364/578 |
| 5,408,638 | 4/1995 | Sagawa et al. | 395/500 |
| 5,416,729 | 5/1995 | Leon et al. | 364/578 |
| 5,424,963 | 6/1995 | Turner et al. | 364/578 |
| 5,432,718 | 7/1995 | Molvig et al. | 364/578 |
| 5,442,733 | 8/1995 | Kaufman et al. | 395/124 |
| 5,548,694 | 8/1996 | Frisken Gibson | 395/124 |
| 5,594,671 | 1/1997 | Chen et al. | 364/578 |
| 5,606,517 | 2/1997 | Traub et al. | 364/578 |

FOREIGN PATENT DOCUMENTS

| | | | |
|---|---|---|---|
| 0 228 915 | 7/1987 | European Pat. Off. | G06F 15/60 |
| WO 92/01993 | 2/1992 | WIPO | G06F 15/60 |

OTHER PUBLICATIONS

Burges et al., "Buoyant Mixtures of Cellular Automation Gases," Complex Systems, 1:31–50 (1987).

Chen et al., "Lattice Boltzmann Model for Stimulation of Magnetohydordynamcis," Physical Review Letters, vol. 67, No. 27 (Dec. 1991), pp. 3776–3779.

Chopard et al., "Cellular Automata Model for Heat Conduction in a Fluid," Pysics Letters A, vol. 126, Nos. 8, 9, pp. 476–480 (Jan. 1988).

(List continued on next page.)

Primary Examiner—Kevin J. Teska
Assistant Examiner—Vuthe Siek
Attorney, Agent, or Firm—Fish & Richardson P.C.

[57] ABSTRACT

To simulate physical processes, state vectors for each of multiple voxels are stored in a memory along with a representation for each of multiple facets that are sized and oriented independently of the size and orientation of the voxels and, in combination, represent one or more surfaces. Each state vector includes multiple entries, each of which corresponds to a number of elements at a particular momentum state of multiple possible momentum states at a voxel. Interaction operations that model interactions between elements of different momentum states are performed on the state vectors, and surface interaction operations that model interactions between a facet and elements at one or more voxels near the facet are performed on the representations of facets. Finally, move operations that reflect movement of elements to new voxels are performed on the state vectors.

35 Claims, 10 Drawing Sheets

OTHER PUBLICATIONS

Clouqueur et al., "RAPI, A Cellular Automation Machine for Fluid Dynamics," Complex Systems, pp. 585–597 (1987).

d'Humieres et al., "2–D and 3–D Hydrodynamics on Lattice Gases," Fruhjahrstagung der Schweiz. Physikalischen Gesellschaft, vol. 59 (1986).

d'Humieres et al., "Lattice Gas Models for 3D Hydrodynamics," 2 (4), pp. 291–297 (1986).

d'Humieres et al., "Numerial Simulations of Hydrodynamics with Lattice Gas Automata in Two Dimensions," Complex Systems 1:599–632 (1987).

Fredkin et al., "Conservative Logic," International Journal of Theoretical Pysics, vol. 21, Nos. 3/4, pp. 219–253 (1982).

Frisch et al., "Lattice–Gas Automata for the Navier–Stokes Equation," Physical Review Letters, vol. 56, No. 14, pp. 1505–1508 (Apr. 1986).

Frisch et al., "Lattice Gas Hydrodynamics in Two and Three Dimensions," Complex Systems 1:649–707 (1987).

Hardy et al., "Molecular Dynamics of a Classical Lattice Gas: Transport Properties and Time Correlation Functions," Physical Review A, vol.13, No. 5, pp. 1949–1961 (May 1976).

Hasslacher, "Discrete Fluids: Part I: Background for Lattice Gas Automata," Los Alamos Science Special Issue, pp. 175–217 (1987).

Henon, "Isometric Collision Rules for the Four–Dimensional FCHC Lattice Gas," Complex Systems 1:475–494 (1987).

Kadanoff, "On Two Levels" Physics Today (Sep. 1986).

Kadanoff et al., "Transport Coefficients Near the Critical Point: A Master Equation Approach," 165 Phys. Review 310 (1968).

Klein, "Negative Absolute Temperatures," Physical Review, vol. 104, No. 3, p. 589 (Nov. 1956).

Lin et al., "Plasma Simulation Using the Massively Parallel Processor," NASA CP–2478, pp. 185–191 (Jul. 1987).

Margolus et al., "Cellular–Automata Supercomputers for Fluid–Dynamics Modeling," Physical Review Letters, vol. 56, No. 16, pp. 1694–1696 (Apr. 1986).

Molvig et al., "Multi–species Lattice–Gas Automata for Realistic Fluid Dynamics," Springer Proceedings in Pysics, vol. 46, pp. 206–231 (1990).

Molvig et al., "Removing the Discreteness Artifacts in 3D Lattice–Gas Fluids," Proceedings of the Workshop on Discrete Kinetic Theory. Lattice Gas Dynamics and Foundations of Hydrodynamics (1989).

Perez et al, "OUPPI–1, A SIMD Computer Using Integrated Parallel Processors," Proc. of Conpar Conf. Papers Plenary Sess. and Stream A Manchester, Sep. 12–16, 1988, British Comp. Soc. Parallel Proc. Spec. Group GB.

Qian et al., "Lattice BGK Models for Navier–Stokes Equation," Europhysics Letters, 17(6):479–484 (1992).

Ramsey, "Thermodynamics and Statistical Mechanics at Negative Absolute Temperatures," Physical Review, vol. 103, No. 1, pp. 20–28 (Jul. 1956).

Rivet, "Three–Dimensional Lattice Gas Hydrodynamical Simulations: First Results," C.R. Acad. Sci. Paris, t. 305, Series II, pp. 751–756 (1987).

Teixeira, "Continuum Limit of Lattice Gas Fluid Dynamics," B.A. Sc. Engineering Science University of Toronto (1988).

Toffoli, "Cellular Automata as an Alternative to (Rather Than an Approximation of) Differentiation Equation in Modeling Physics," Physica 10D:117–127 (1984).

Tucker, "Cellular Automata Machine: The Ultimate Parallel Computer," High Technology, pp. 85–87 (Jun. 1984).

Vichniac, "Cellular–Automata Fluids," Instabilities and Nonequilibrium Structures II, pp. 97–116 (1989).

Vichniac, "Stimulating Physics with Cellular Automata," Physica, 10D:96–110 (1984).

Wolfram, "Cellular Automation Fluids 1: Basic Theory," J. Stat. Phys., vol. 45, Nos. 3/4, pp. 471–526 (1986).

Product Literature, "Digital Physics Technology Principles & Applications," Exa Corporation (Aug. 1994).

Product Literature, "Understanding Fluid CAD, ExaResolute Product Technical Description," Exa Corporation (1994).

Kaufman et al "Volume Graphics," IEEE, Jul. 1993, pp. 51–64.

Lawerence J. Rosenblum, "Photorealistic Terrain Imaging and Flight Simulation," IEEE, 1994 pp. 10–12.

COMPUTER SYSTEM FOR SIMULATING PHYSICAL PROCESSES

This application is a continuation-in-part of U.S. application Ser. No. 08/165,293, filed Dec. 10, 1993, now U.S. Pat. No. 5,594,671.

BACKGROUND OF THE INVENTION

This invention relates to computer systems for simulating physical processes, e.g., fluid flow.

The conventional approach to simulating high Reynolds number flow has been to generate discretized solutions of the Navier-Stokes differential equations, in which high-precision floating point arithmetic operations are performed at each of many discrete spatial locations on variables representing the macroscopic physical quantities (e.g., density, temperature, flow velocity). The fastest and most powerful computers available are used, and yet very limited and inexact results have been achieved. To keep run times manageable, very coarse grid resolutions are used, and even at those coarse resolutions there are unacceptable errors in the solutions due to accumulated round off errors inherent in performing successive floating point arithmetic operations.

There has long been an effort to replace the differential equation approach with what is generally known as lattice gas (or cellular) automata, in which the macroscopic-level simulation provided by solving the Navier-Stokes equations is replaced by a microscopic-level model that performs operations on particles moving between sites on a lattice. The goal has long been to find a microscopic-level model of particle interactions and movement that would produce the correct macroscopic results (i.e., variations in density, temperature, etc. as prescribed by the Navier Stokes equations).

The traditional lattice gas simulation assumes a limited number of particles at each lattice site, with the particles being represented by a short vector of bits. Each bit represents a particle moving in a particular direction. For example, one bit in the vector might represent the presence (when set to 1) or absence (when set to 0) of a particle moving along a particular direction. Such a vector might have six bits, with, for example, the values 110000 indicating two particles moving in opposite directions along the X axis, and no particles moving along the Y and Z axes. A set of collision rules governs the behavior of collisions between particles at each site (e.g., a 110000 vector might become a 001100 vector, indicating that a collision between the two particles moving along the X axis produced two particles moving away along the Y axis). The rules are implemented by supplying the state vector to a lookup table, which performs a permutation on the bits (e.g., transforming the 110000 to 001100). Particles are then moved to adjoining sites (e.g., the two particles moving along the Y axis would be moved to neighboring sites to the left and right along the Y axis).

Molvig et al. taught an improved lattice gas technique in which, among other things, many more bits were added to the state vector at each lattice site (e.g., 54 bits for subsonic flow) to provide variation in particle energy and movement direction, and collision rules involving subsets of the full state vector were employed. Molvig et al. PCT/US91/04930; Molvig et al., "Removing the Discreteness Artifacts in 3D Lattice-Gas Fluids", Proceedings of the Workshop on Discrete Kinetic Theory, Lattice Gas Dynamics, and Foundations of Hydrodynamics, World Scientific Publishing Co., Pte., Ltd., Singapore (1989); Molvig et al., "Multi-species Lattice-Gas Automata for Realistic Fluid Dynamics", Springer Proceedings in Physics, Vol. 46, Cellular Automata and Modeling of Complex Physical Systems, Springer-Verlag Berlin, Heidelberg (1990) (all hereby incorporated by reference) These improvements and others taught by Molvig et al. produced the first practical lattice-gas computer system. Discreteness artifacts that had made earlier lattice gas models inaccurate at modeling fluid flow were eliminated.

Chen et al. taught an improved simulation technique in "Computer System For Simulating Physical Processes", U.S. application Ser. No. 08/165,293, filed Dec. 10, 1993 now U.S. Pat. No. 5,594,671 (which is hereby incorporated by reference). Instead of the lattice gas model in which at each lattice site, or voxel (these two terms are used interchangeably throughout this document), there is at most a single particle in any momentum state (e.g., at most a single particle moving in a particular direction with a particular energy), the system used a multi-particle technique in which, at each voxel, multiple particles could exist at each of multiple states (e.g., 0–255 particles could be moving in a particular direction). The state vector, instead of being a set of bits, was a set of integers (e.g., a set of eight bit bytes providing integers in the range of 0 to 255), each of which represented the number of particles in a given state. Thus, instead of being limited to a single particle moving in each direction at each momentum state, the system had the flexibility to model multiple particles moving in each direction at each momentum state.

Chen et al.'s use of integer state vectors made possible much greater flexibility in microscopic modeling of physical processes because much more variety was possible in the collision rules that operated on the new integer state vectors. For example, rules were established that collided and scattered a predetermined number of particles while allowing other particles to pass without collision. Integer state vectors also promised to provide solutions to many problems still remaining in single-particle lattice gas techniques even after the improvements taught in the Molvig et al. publications. For example, the multi-particle technique provided a way of achieving the so-called microscopic Maxwell-Boltzmann statistics that are characteristic of many fluids. The earlier Molvig et al. system achieved so-called Fermi-Dirac statistics, which only resemble Maxwell-Boltzmann statistics if the lattice sites are sparsely populated. The Chen et al. system avoided the need to use a sparsely populated lattice, and thus avoided the huge computational penalty associated therewith.

The Chen et al. system also provided a way of simulating the interaction between fluid particles and solid objects using a new "slip" technique that extended the simulation only to the outer surface of the boundary layer around a solid object, and not through it to the surface of the solid object. At the outer surface of the boundary layer, the collision rules governing interactions between particles and the surface allowed particles to retain tangential momentum. Instead of the particles being returned from the surface in the reverse tangential direction from which they arrived (as occurred with a prior "bounce back" technique), the particles were permitted to reflect from the surface and continue in the same tangential direction in which they arrived.

To preserve tangential momentum, the Chen et al. system specularly reflected particles with respect to the normal of the solid surface. A colliding particle left the surface at an opposite but approximately equal angle with respect to the normal. Chen et al.'s multi-particle model (in which more than one particle was allowed to have the same state at a point in the lattice) provided a simple and efficient way of modeling such slip collisions.

Chen et al. employed both "slip" and "bounce back" collision techniques in combination to simulate surfaces with a range of skin friction, from the very high skin friction of pure "bounce back" to the very low skin friction provided by "slip". Varying fractions of the particles were treated with "bounce back" rules, and the remainder were treated with "slip" rules.

The multi-particle model of Chen et al. accommodated arbitrary angular orientation of the solid boundary with respect to the lattice by allowing use of a weighted average of multiple outgoing states to assure that the average momentum of the outgoing particles was in a direction closely approximating true specular reflection. For example, from three to six different particle states (i.e., different directions and energies) could be used, each populated with enough outgoing particles that the net outgoing momentum was approximately equal to specular reflection of the group of incoming particles colliding with the surface.

Chen et al. described techniques for preserving energy, mass and momentum normal to the solid boundary. Momentum normal to the solid boundary was preserved using a "pushing/pulling" technique that compared the overall incoming normal momentum to the overall outgoing normal momentum and recorded the normal surplus or deficit (i.e., the amount of normal momentum that had to be made up in some way that did not introduce artifacts into the simulation). Chen et al. then used a set of pushing/pulling rules to drive the normal surplus toward zero. Particles were moved from certain out-states to other out-states so that only normal momentum was affected.

Changes in energy were accommodated by a "cooling" (or heating) technique that used a total energy counter to keep track of an energy surplus (or deficit) and cooling/heating rules to drive the surplus toward zero. A cooling rule specified four states, two source states and two destination states. The two source states had the same momentum as the two destination states, but had a combined energy total that was higher than that of the two destination states. Moving a particle from both of the source states into both of the destination states decreased energy while conserving mass and momentum.

Chen et al. used "dieting" rules to remove any surplus mass that accumulated as the result of one or more of the collision rules. A dieting rule specified two source states and one destination state. The two source states had a combined energy and momentum that was the same as the one destination state. Removing a particle from each of the source states and putting a particle into the one destination state caused the mass to be reduced while the energy and momentum were preserved.

SUMMARY OF THE INVENTION

The invention features an improved technique for simulating the interaction between fluid particles and solid boundaries in a computer system for simulating physical processes. In the improved technique, the surface of a boundary is represented as a collection of facets that are unrestricted by voxel boundaries, and may be arbitrarily oriented and sized relative to the lattice geometry of the voxels. The improved technique permits a continuously varying surface to be simulated with precision that is significantly greater than the precision of the lattice.

A lattice gas is traditionally pictured as a set of discrete points distributed in a lattice structure that overlies a continuum. Particles of the lattice gas are point masses that propagate between lattice sites. The entire system is discretized in both space and time, and no physical meaning is assigned to non-integer space and time values. This model of a lattice gas has the virtue of being simple to envision and implement, but is not easily translated to a continual real physics system.

An alternate physical picture of the lattice gas can be formed by assuming that the mass associated with each particle of the lattice gas is uniformly distributed throughout the volume of the voxel occupied by the particle. Propagation of particles may be viewed as movement of this distributed mass in the distance and direction indicated by the velocity of the particle. When particles are moving between adjacent fluid voxels, this distributed mass view of the lattice gas is equivalent to the traditional view of the lattice gas. However, the distributed mass view of the lattice gas offers the considerable advantage that it permits the particles of the lattice gas to interact with a surface that is arbitrarily oriented relative to the structure of the lattice.

In one aspect, generally, the invention features storing in a memory state vectors for multiple voxels and a representation for at least one surface that is sized and oriented independently of the size and orientation of the voxels. The state vectors include multiple entries that correspond to elements at particular momentum states of multiple possible momentum states at a voxel. Interaction operations that model interactions between elements of different momentum states are performed on the state vectors, and surface interaction operations that model interactions between a surface and elements at one or more voxels near the facet are performed on the representations of the surface. Finally, move operations that reflect movement of elements to new voxels are performed on the state vectors. By permitting the surface to be oriented and sized arbitrarily relative to the orientation and size of the voxels, the invention permits interactions with a surface to be simulated with increased resolution relative to the size of the voxels. This, in turn, permits highly accurate simulations of physical processes such as fluid flow.

Preferred embodiments of the invention include one or more of the following features. For example, the entries of the state vectors may represents a density of elements per unit volume in a particular momentum state of a voxel. As discussed above, this distributive mass view of the state vectors offers considerable advantages.

In addition, as described by Chen et al., the entries of the state vectors may have integer values, and the interaction operations may be performed using integer values. However, to permit arbitrary orientation and sizing of the surface facets, the surface interaction operations may be performed using values representative of real number, such as floating point values. This hybrid approach permits the processing efficiency offered by integer operations to be obtained simultaneously with the structural flexibility offered by real numbers. To ensure that system accuracy will not be impaired by inaccuracies introduced by real number calculations, exact conservation of mass, momentum and energy is enforced as simulated elements are moved from a surface facet to a voxel. Voxels that are intersected by a surface (and occupied by the region underlying the surface) may be viewed as partial voxels.

A surface may be represented as a collection of facets that are sized and oriented independently of the size and orientation of the voxels and, in combination, represent at least one surface. In this case, the surface interaction operations model interactions between a facet and elements of at least one voxel near the facet. The elements may represent particles of a fluid and the facets may represent at least one surface over which the fluid flows.

For each facet, the surface interaction operations may include gathering elements from a first set of one or more voxels that interact with the facet, modelling interactions between the gathered elements and the facet to produce a set of surface interacted elements, and scattering the surface interacted elements to a second set of one or more voxels that interact with the facet. Typically, the surface interaction operations occur as a component of the operations by which elements are moved from voxel to voxel. The gather and scatter steps account for the arbitrary orientation of the facets. This permits the modelling step to be performed without regard to that orientation. Typically, the first set of voxels is identical to the second set of voxels.

When a portion of a voxel is occupied by one or more facets, or portions thereof, a factor indicative of the portion of the voxel that is not occupied by any facets (or material underlying a facet) is stored with the state vector for the facet. This factor permits operations to be performed on an occupied voxel without further regard to the degree to which the voxel is occupied. For example, the factor for a voxel may be considered when gathering elements from the voxel.

The elements obtained in the gather step for a particular momentum state may be identified as the elements occupying a region projected from the facet in the opposite direction of the velocity of the momentum state. Accordingly, the first set of voxels may include one or more voxels that overlap at least a portion of a region defined by a vector dot product of a vector representing a normal direction relative to the facet with a vector representing the velocity of the momentum state for which elements are being gathered. In particular, the first set of voxels may include all voxels that at least partially overlap a region projected from the facet and having a volume that equals the vector dot product multiplied by a surface area of the facet.

The elements obtained in the gather step may also include elements scattered from one or more other facets. When a surface includes non-convex features such as an interior corner, a region projected from a facet may be partially occupied by another facet. To account for this situation, elements are also gathered from appropriately oriented facets.

Typically, interactions between the gathered elements and the facet are modelled so that the set of surface interacted elements satisfies one or more boundary conditions. The boundary conditions may include tangential momentum conditions. When the surface represented by a facet has no surface friction, the tangential momentum condition is satisfied when a combined momentum of the gathered elements that is tangential to the facet equals a combined momentum of the surface interacted elements that is tangential to the facet. When the surface includes friction, the tangential momentum condition is satisfied when a difference between the combined tangential momentum of the gathered elements and the combined tangential momentum of the surface interacted elements is related to the level of surface friction of the surface (e.g., when the surface is completely non-slip, the combined tangential momentum of the surface interacted elements is zero).

The boundary conditions may also include a normal momentum condition that is satisfied when a difference between a combined momentum of the gathered elements that is normal to the facet and a combined momentum of the surface interacted elements that is normal to the facet equals a pressure in a region defined by one or more voxels of the first set of voxels.

The boundary conditions may also require conservation of mass and energy at the boundary. These conditions are satisfied when a combined mass of the gathered elements equals a combined mass of the surface interacted elements, and a combined energy of the gathered elements equals a combined energy of the surface interacted elements.

When a state vector includes integers representative of particular momentum states and the surface interaction operations are performed using values representative of real numbers, care must be taken to ensure that the integer values of the state vectors do not overflow or underflow when the surface interacted elements are scattered to the voxels. For this purpose, procedures that conserve the mass, momentum and energy of a voxel are employed whenever truncation is necessary to avoid overflow or underflow.

In another aspect, generally, the invention features simulating a physical process by storing in a memory state vectors for multiple voxels, with the state vectors including entries that correspond to particular momentum states of multiple possible momentum states at a voxel. Thereafter, operations are performed on the state vectors to model interactions between elements of different momentum states and movement of elements relative to the voxels, with at least some of the operations being performed using floating point numbers and some of the operations being performed using integers. Transitions between floating point and integer values may be made in a way that preserves physical properties of the physical process such as mass and energy. The entries of the state vectors may be integers representing a density of elements per unit volume in a particular momentum state. In addition, a representation of at least one surface that is sized and oriented independently of the size and orientation of the voxels may be stored in memory, and the operations performed using floating point numbers may be the operations that model interactions of the elements with the surface.

The disclosures of U.S. application Ser. No. 08/409,685, filed Mar. 23, 1995 now U.S. Pat. No. 5,640,335; U.S. application Ser. No. 08/255,409, filed Jun. 8, 1994 now U.S. Pat. No. 5,606,517; U.S. application Ser. No. 08/030,573, filed Mar. 12, 1993, now U.S. Pat. No. 5,377,129; PCT application Ser. No. PCT/US91/04930, filed Jul. 12, 1991; U.S. application Ser. No. 07/812,881, filed Dec. 20, 1991, now abandoned; and U.S. application Ser. No. 07/555,754, filed Jul. 12, 1990, now abandoned are all hereby incorporated by reference.

Other features and advantages of the invention will be apparent from the following detailed description of the preferred embodiments, and from the claims.

DESCRIPTION OF THE PREFERRED EMBODIMENTS

Figure 1:
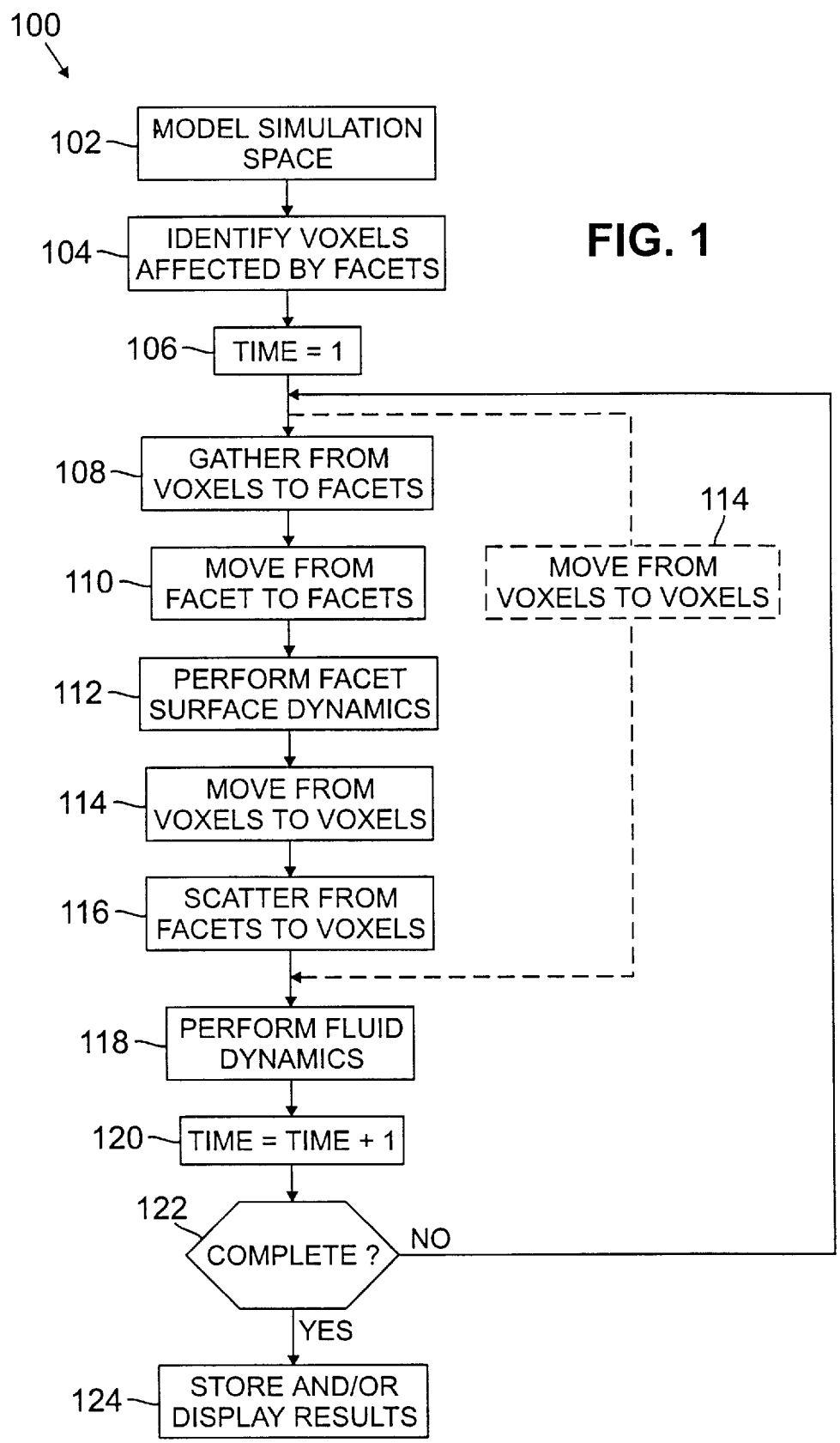
FIG. 1 is a flow chart of a procedure followed by a physical process simulation system

Referring to FIG. 1, a physical process simulation system operates according to a procedure 100 to simulate a physical process such as fluid flow. Prior to the simulation, a simulation space is modelled as a collection of voxels (step 102). Typically, the simulation space is generated using a computer-aided-design (CAD) program. For example, a CAD program could be used to draw an automobile positioned in a wind tunnel. Thereafter, data produced by the CAD program is processed to add a lattice structure having appropriate resolution and to account for objects and surfaces within the simulation space.

Each lattice site, or voxel, contains 54 states for subsonic mono-species simulations. The number of states is increased for transonic flows or multiple-species simulations.

The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$Re = uL/v.$$

The characteristic length of an object represents large scale features of the object. For example, if flow around an automobile were being simulated, the height of the automobile might be considered to be the characteristic length. When flow around small regions of an object (e.g., the side mirror of an automobile) is of interest, the resolution of the simulation may be increased, or areas of increased resolution may be employed around the regions of interest. The dimensions of the voxels decrease as the resolution of the lattice increases.

In this document the state space is represented as $N_i(x, t)$, where $N_i$ represents the number of elements, or particles, per unit volume in state i (i.e., the density of particles in state i) at a lattice site denoted by the three-dimensional vector x at a time t. For a known time increment, the number of particles is referred to simply as $N_i(x)$. The combination of the state representations for all states of a lattice site is denoted as $N(x)$.

The number of states is determined by the number of possible velocity vectors within each energy level. The velocity vectors consist of integer linear speeds in four-dimensional space: x, y, z and w. The fourth dimension, w, is projected back onto three-dimensional space and thus does not indicate an actual velocity in the three-dimensional lattice. For subsonic flows, i ranges from 0 to 53.

Each state represents a different velocity vector at a specific energy level (i.e., energy level zero, one or two). The velocity of each state is indicated with its "speed" in each of the four dimensions as follows:

$$c_i = (c_x, c_y, c_z, c_w)$$

The energy level zero state represents stopped particles that are not moving in any dimension, i.e. $C_{stopped} = (0, 0, 0, 0)$. Energy level one states represent particles having a ±1 speed in two of the four dimensions and a zero speed in the other two dimensions. Energy level two states represent particles having either a ±1 speed in all four dimensions, or a ±2 speed in one of the four dimensions and a zero speed in the other three dimensions.

Generating all of the possible permutations of the three energy levels gives a total of 49 possible states (one energy zero state, 24 energy one states, 24 energy two states). However, the subsonic flow state space maintains a total of six stopped states as opposed to one, giving a total state count of 54 instead of 49.

Each voxel (i.e., each lattice site) is represented by a state vector. The state vector completely defines the status of the voxel and includes 54 multi-bit entries, each of which corresponds to an integer value. The 54 entries correspond to the six rest states, 24 directional vectors at the first energy level and 24 directional vectors at the second energy level. Six rest states are employed to ensure that there are a sufficient number of rest "slots". Of course this same effect could be achieved by increasing the number of bits in the entry corresponding to the rest state in a 49 entry embodiment. By using multi-bit entries, the system offers substantially improved performance over systems that used single-bit entries to define voxel status. In particular, unlike single-bit systems that could only produce Fermi-Dirac statistics, which are unsuitable for many applications, the system can produce Maxwell-Boltzmann statistics for the achieved equilibrium state vector.

Figure 2:
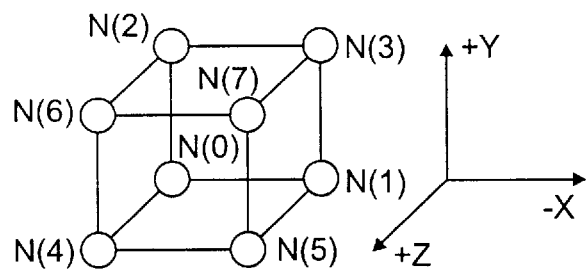
FIG. 2 is a perspective view of a microblock.

For processing efficiency, the voxels are grouped in 2×2×2 volumes that are called microblocks. The microblocks are organized to optimize parallel processing of the voxels as well as to minimize the overhead associated with the data structure. A short-hand notation for the voxels in the microblock is defined as $N_i(n)$, where n represents the relative position of the lattice site within the microblock and n ∈ {0,1,2, ..., 7}. A microblock is illustrated in FIG. 2.

Figure 3A:
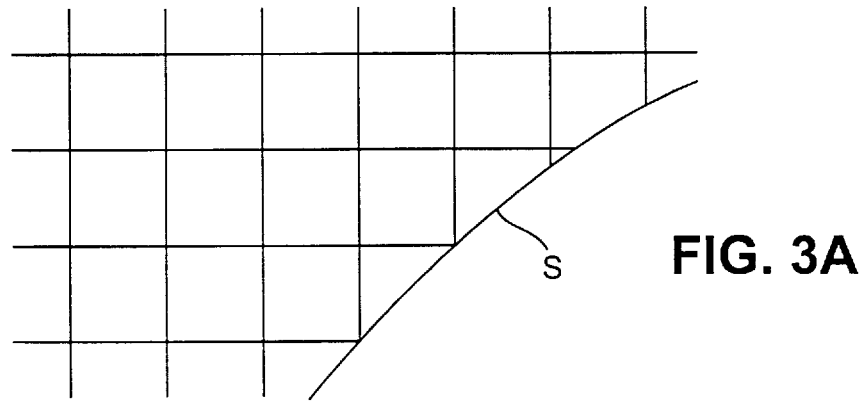
FIGS. 3A and 3B are illustrations of lattice structures used by the system of FIG. 1.
Figure 3B:
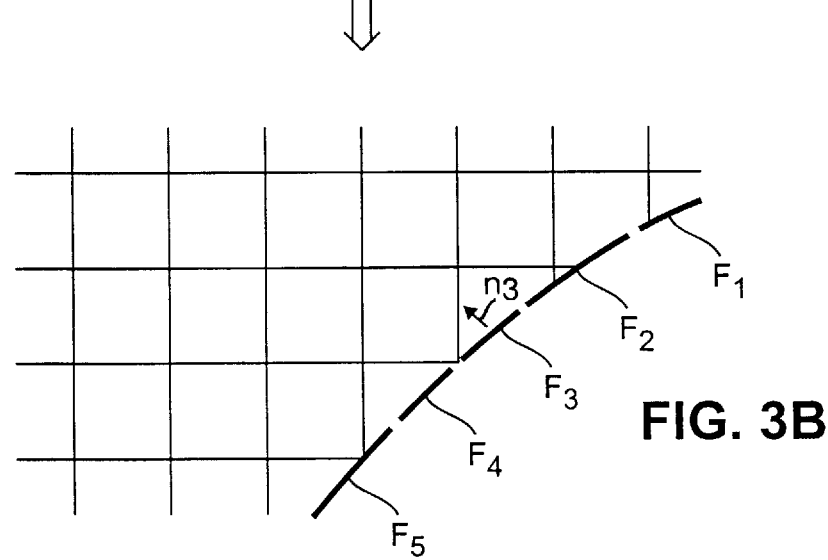

Referring to FIGS. 3A and 3B, a surface S (FIG. 3A) is represented in the simulation space (FIG. 3B) as a collection of facets $F_\alpha$:

$$S = \{F_\alpha\}$$

where α is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and facet distribution function ($N_f(\alpha)$) that describes the surface dynamic properties of the facet.

Figure 4:
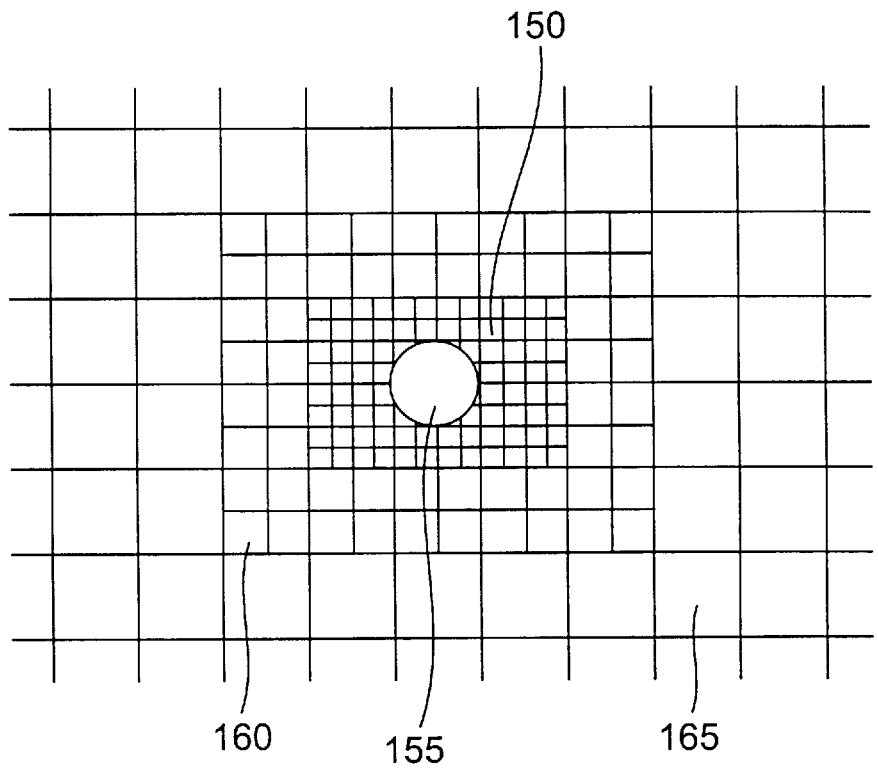
FIGS. 4 and 5 illustrate variable resolution techniques.
Figure 5:
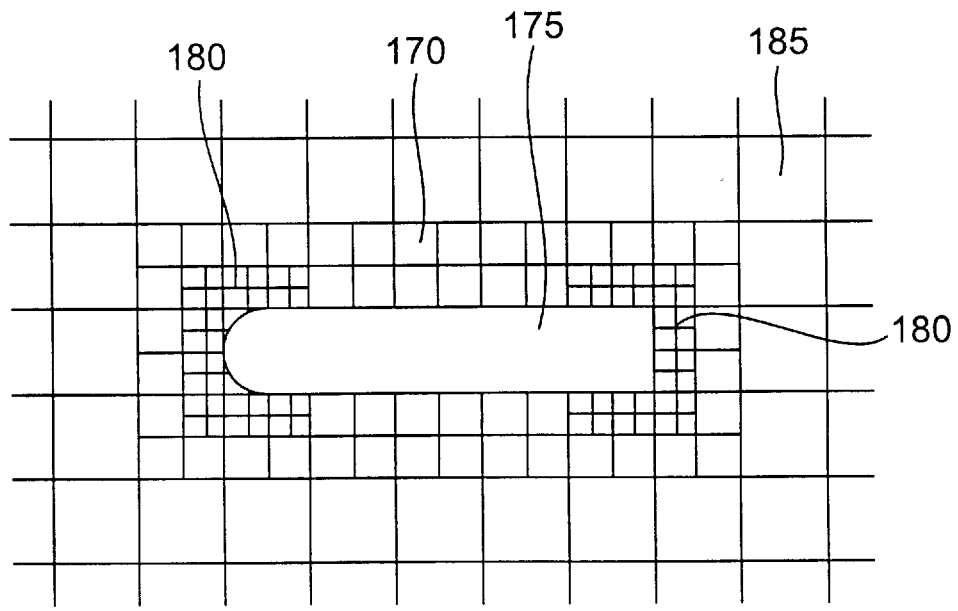

Referring to FIG. 4, different levels of resolution may be used in different regions of the simulation space to improve processing efficiency. Typically, the region 150 around an object 155 is of the most interest and is therefore simulated with the highest resolution. Because the effect of viscosity decreases with distance from the object, decreasing levels of resolution (i.e., expanded voxel volumes) are employed to simulate regions 160, 165 that are spaced at increasing distances from the object 155. Similarly, as illustrated in FIG. 5, a lower level of resolution may be used to simulate a region 170 around less significant features of an object 175 while the highest level of resolution is used to simulate regions 180 around the most significant features (e.g., the leading and trailing surfaces) of the object 175. Outlying regions 185 are simulated using the lowest level of resolution and the largest voxels. Techniques for processing interactions between differently sized voxels are discussed by Molvig et al. in U.S. Pat. No. 5,377,129, which is incorporated herein by reference, at col. 18, line 58 to col. 28, line 21. Techniques for processing interactions between differently sized voxels and the facets of a surface are discussed below.

Referring again to FIG. 1, once the simulation space has been modelled (step 102), voxels affected by one or more facets are identified (step 104). Voxels may be affected by facets in a number of ways. First, voxels that are intersected by facets are affected in that each of these voxels has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Figure 6:
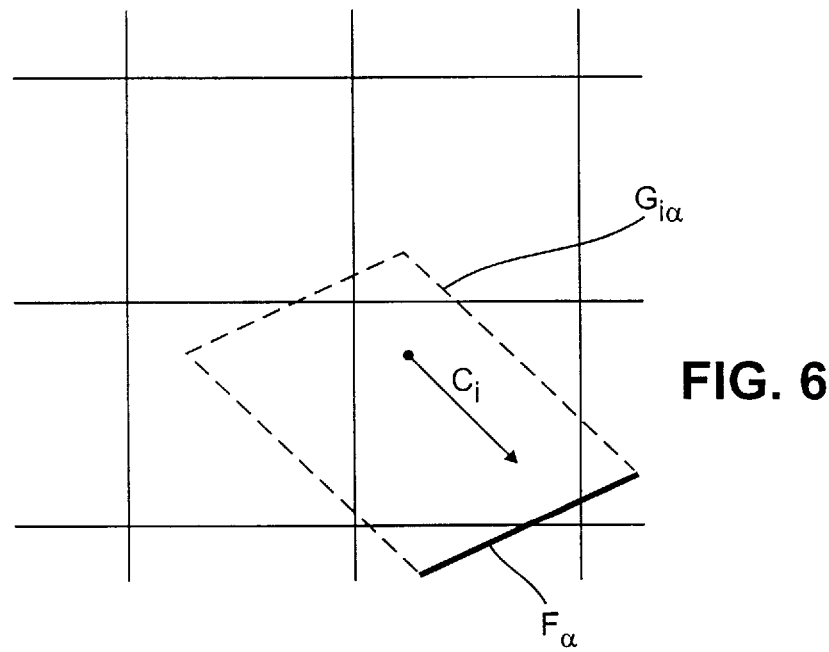
FIG. 6 illustrates regions affected by a facet of a surface.

Referring to FIG. 6, for each state i having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i \cdot n_\alpha|$) and a base defined by the surface area $A_\alpha$ of the facet so that the volume $V_{i\alpha}$ of the parallelepiped $G_{i\alpha}$ equals:

$$V_{i\alpha} = |c_i \cdot n_\alpha| A_\alpha.$$

The facet $F_\alpha$ receives particles from the volume $V_{i\alpha}$ when the velocity vector of the state is directed toward the facet ($c_i \cdot n_\alpha < 0$), and transfers particles to the region when the velocity vector of the state is directed away from the facet ($c_i \cdot n_\alpha > 0$). As will be discussed below, this expression must be modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of or smaller than the size of the voxels located near the facet.

The portion of a voxel $N(x)$ overlapped by a parallelepiped $G_{i\alpha}$ is defined as $V_{i\alpha}(x)$. Using this term, the number of state i particles that move between a voxel $N(x)$ and a facet $F_\alpha$ equals the density of state i particles in the voxel multiplied by the volume of the region of overlap with the voxel:

$$\Gamma_{i\alpha}(x) = N_i(x) V_{i\alpha}(x).$$

When the parallelepiped $G_{i\alpha}$ is intersected by one or more facets, the following condition is true:

$$V_{i\alpha} = \sum_x V_{i\alpha}(x) + \sum_\beta V_{i\alpha}(\beta),$$

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha} = \sum_x V_{i\alpha}(x).$$

Once the voxels that are affected by one or more facets are identified (step 104), a timer is initialized to begin the simulation (step 106). During each time increment of the simulation, movement of particles from voxel to voxel is simulated by an advection stage (steps 108–116) that accounts for interactions of the particles with surface facets. Next, a collision stage (step 118) simulates the interaction of particles within each voxel. Thereafter, the timer is incremented (step 120). If the incremented timer does not indicate that the simulation is complete (step 122), the advection and collision stages (steps 108–120) are repeated. If the incremented timer indicates that the simulation is complete (step 122), results of the simulation are stored and/or displayed (step 124).

To correctly simulate interactions with a surface, each facet must meet four boundary conditions. First, the combined mass of particles received by a facet must equal the combined mass of particles transferred by the facet (i.e., the net mass flux to the facet must equal zero). Second, the combined energy of particles received by a facet must equal the combined energy of particles transferred by the facet (i.e., the net energy flux to the facet must equal zero). These two conditions can be satisfied by requiring the net mass flux at each energy level (i.e., energy levels one and two) to equal zero.

The other two boundary conditions are related to the net momentum of particles interacting with a facet. For a surface with no skin friction, referred to herein as a slip surface, the net tangential momentum flux must equal zero and the net normal momentum flux must equal the local pressure at the facet. Thus, the components of the combined received and transferred momentums that are perpendicular to the normal $n_\alpha$ of the facet (i.e., the tangential components) must be equal, while the difference between the components of the combined received and transferred momentums that are parallel to the normal $n_\alpha$ of the facet (i.e., the normal components) must equal the local pressure at the facet. For non-slip surfaces, friction of the surface reduces the combined tangential momentum of particles transferred by the facet relative to the combined tangential momentum of particles received by the facet by a factor that is related to the amount of friction.

As a first step in simulating interaction between particles and a surface, particles are gathered from the voxels and provided to the facets (step 108). As noted above, the number of state i particles that move between a voxel $N(x)$ and a facet $F_\alpha$ is:

$$\Gamma_{i\alpha}(x) = N_i(x) V_{i\alpha}(x).$$

From this, for each state i directed toward a facet $F_\alpha$ ($c_i \cdot n_\alpha < 0$), the number of particles provided to the facet $F_\alpha$ by the voxels is:

$$\Gamma_{i\alpha V \to F} = \sum_x \Gamma_{i\alpha}(x) = \sum_x N_i(x) V_{i\alpha}(x).$$

Only voxels for which $V_{i\alpha}(x)$ has a non-zero value must be summed. As noted above, the size of the facets are selected so that $V_{i\alpha}(x)$ has a non-zero value for only a small number of voxels. Because $V_{i\alpha}(x)$ and $P_f(x)$ may have non-integer values, $\Gamma_\alpha(x)$ is stored and processed as a real number.

Figure 8:
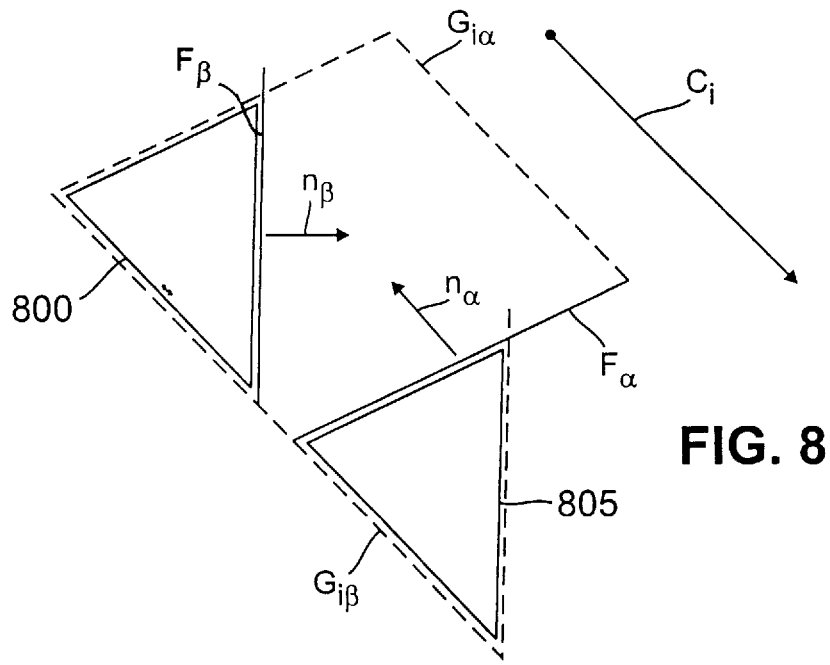
FIG. 8 illustrates movement of particles from a surface to a surface.

Next, particles are moved between facets (step 110). If the parallelepiped $G_{i\alpha}$ for an incoming state ($c_i \cdot n_\alpha < 0$) of a facet $F_\alpha$ is intersected by another facet $F_\beta$, then a portion of the state i particles received by the facet $F_\alpha$ will come from the $F_\beta$. In particular, facet $F_\alpha$ will receive a portion of the state i particles produced by facet $F_\beta$ during the previous time increment. This relationship is illustrated in FIG. 8, where a portion 800 of the parallelepiped $G_{i\alpha}$ that is intersected by facet $F_\beta$ equals a portion 805 of the parallelepiped $G_{i\beta}$ that is intersected by facet $F_\alpha$. As noted above, the intersected portion is denoted as $V_{i\alpha}(\beta)$. Using this term, the number of state i particles that move between a facet $F_\beta$ and a facet $F_\alpha$ may be described as:

$$\Gamma_{i\alpha}(\beta) = \Gamma_i(\beta) V_{i\alpha}(\beta) / V_{i\alpha},$$

where $\Gamma_i(\beta)$ is a measure of the state i particles produced by the facet $F_\beta$ during the previous time increment. From this, for each state i directed toward a facet $F_\alpha$ ($c_i \cdot n_\alpha < 0$), the number of particles provided to the facet $F_\alpha$ by the other facets is:

$$\Gamma_{i\alpha F \to F} = \sum_\beta \Gamma_{i\alpha}(\beta) = \sum_\beta \Gamma_i(\beta) V_{i\alpha}(\beta) / V_{i\alpha}$$

and the total flux of state i particles into the facet is:

$$\Gamma_{iIN}(\alpha) = \Gamma_{i\alpha V \to F} + \Gamma_{i\alpha F \to F} = \sum_x N_i(x) V_{i\alpha}(x) + \sum_\beta \Gamma_i(\beta) V_{i\alpha}(\beta) / V_{i\alpha}.$$

The state vector $V(\alpha)$ for the facet, also referred to as a facet distribution function, has 54 entries corresponding to the 54 entries of the voxel state vectors. The input states of the facet distribution function $N(\alpha)$ are set equal to the flux of particles into those states divided by the volume $V_{i\alpha}$:

$$N_i(\alpha) = \Gamma_{iIN}(\alpha) / V_{i\alpha},$$

for $c_i \cdot n_\alpha < 0$.

The facet distribution function is a simulation tool for generating the output flux from a facet, and is not necessarily representative of actual particles. To generate an accurate output flux, values are assigned to the other states of the distribution function. Outward states are populated using the techniques described above for populating the inward states:

$$N_i(\alpha) = \Gamma_{iOTHER}(\alpha) / V_{i\alpha},$$

for $c_i \cdot n_\alpha \geq 0$, wherein $\Gamma_{iOTHER}(\alpha)$ is determined using the technique described above for generating $\Gamma_{iIN}(\alpha)$. (Of course, instead of applying the technique to incoming states ($c_i \cdot n_\alpha < 0$), the technique is now applied for other states ($c_i \cdot n_\alpha \geq 0$)). In an alternative approach, $\Gamma_{iOTHER}(\alpha)$ is generating using values of $\Gamma_{iOUT}(\alpha)$ from the previous time step so that:

$$\Gamma_{iOTHER}(\alpha, t) = \Gamma_{iOUT}(\alpha, t-1).$$

For parallel states ($c_i \cdot n_\alpha = 0$), both $V_{i\alpha}$ and $V_{i\alpha}(x)$ are zero. In the expression for $N_i(\alpha)$, $V_{i\alpha}(x)$ appears in the numerator (from the expression for $\Gamma_{iOTHER}(\alpha)$) and $V_{i\alpha}$ appears in the denominator (from the expression for $N_i(\alpha)$). Accordingly, $N_i(\alpha)$ for parallel states is determined as the limit of $N_i(\alpha)$ as $V_{i\alpha}$ and $V_{i\alpha}(x)$ approach zero.

The values of states having zero velocity (i.e., rest states and states (0, 0, 0, 2) and (0, 0, 0,−2)) are initialized at the beginning of the simulation based on initial conditions for temperature and pressure. These values are then adjusted over time.

Figure 9:
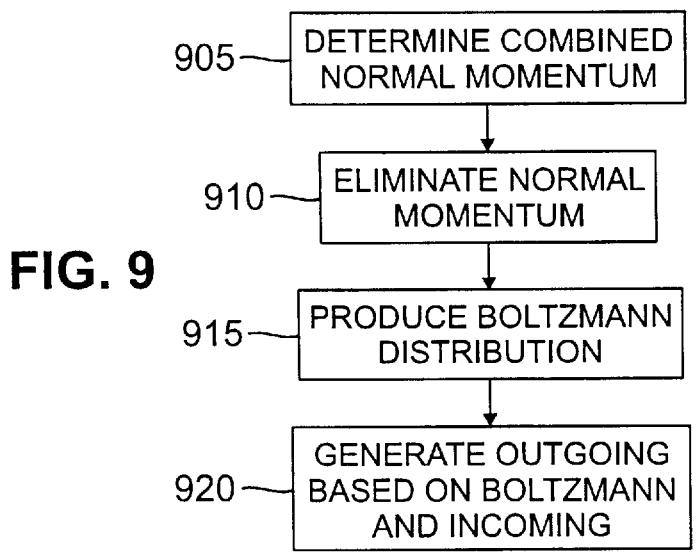
FIG. 9 is a flow chart of a procedure for performing surface dynamics.

Next, surface dynamics are performed for each facet to satisfy the four boundary conditions discussed above (step 112). A procedure for performing surface dynamics for a facet is illustrated in FIG. 9. Initially, the combined momentum normal to the facet $F_x$ is determined (step 905) by determining the combined momentum $P(\alpha)$ of the particles at the facet as:

$$P(\alpha) = \sum_i c_i * N_i(\alpha) \text{ for all } i.$$

From this, the normal momentum $P_n(\alpha)$ is determined as:

$$P_n(\alpha) = n_\alpha \cdot P(\alpha).$$

This normal momentum is then eliminated using the pushing/pulling technique described by Chen et al (step 910) to produce $N_{n-}(\alpha)$. Thereafter, the particles of $N_{n-}(\alpha)$ are collided to produce a Boltzmann distribution $N_{n-B}(\alpha)$ (step 915). (Processes for colliding particles to produce a Boltzmann distribution are described below.)

An outgoing flux distribution for the facet $F_\alpha$ is then determined (step 920) based on the incoming flux distribution and the Boltzmann distribution. First, the difference between the incoming flux distribution $\Gamma_i(\alpha)$ and the Boltzmann distribution is determined as:

$$\Delta \Gamma_i(\alpha) = \Gamma_{iIN}(\alpha) - N_{n-Bi}(\alpha) V_{i\alpha}.$$

Using this difference, the outgoing flux distribution is:

$$\Gamma_{iOUT}(\alpha) = N_{n-Bi}(\alpha) V_{i\alpha} - \Delta \Gamma_{i*}(\alpha),$$

for $n_\alpha \cdot c_i > 0$ and where $i^*$ is the state having a direction opposite to state i. For example, if state i is (1, 1, 0, 0), then state $i^*$ is (−1, −1, 0, 0). To account for skin friction and other factors, the outgoing flux distribution may be further refined to:

$$\begin{aligned}\Gamma_{iOUT}(\alpha) = & N_{n-Bi}(\alpha) V_{i\alpha} - \Delta \Gamma_{i*}(\alpha) + \\ & K_f(n_\alpha \cdot c_i)[N_{n-Bi*}(\alpha) - N_{n-Bi}(\alpha)] V_{i\alpha} + \\ & (n_\alpha \cdot c_i)(t_{1\alpha} \cdot c_i) \Delta N_{j,1} V_{i\alpha} + \\ & (n_\alpha \cdot c_i)(t_{2\alpha} \cdot c_i) \Delta N_{j,2} V_{i\alpha},\end{aligned}$$

for $n_\alpha \cdot c_i > 0$ and where $K_f$ is a function of skin friction, $t_{1\alpha}$ is a first tangential vector that is perpendicular to $n_\alpha$, $t_{2a}$ is a second tangential vector that is perpendicular to both $n_\alpha$ and $t_{1\alpha}$, and $\Delta N_{j,1}$ and $\Delta N_{j,2}$ are distribution functions corresponding to the energy (j) of the state i and the indicated tangential vector. The distribution functions are determined according to:

$$\Delta N_{j,1,2} = -\frac{1}{2j^2} \left( n_\alpha \cdot \sum_i c_i c_i N_{n-Bi}(\alpha) \cdot t_{1,2\alpha} \right),$$

where j equals 1 for energy level 1 states and 2 for energy level 2 states.

The functions of each line of the equation for $\Gamma_{iOUT}(\alpha)$ are as follows. The terms on the first line enforce the normal momentum flux boundary condition to the extent that collisions have been effective in producing a Boltzmann distribution, but include a tangential momentum flux anomaly. The terms on the third and fourth lines correct for this anomaly, which may arise due to discreteness effects or non-Boltzmann structure due to insufficient collisions. Finally, the term on the second line adds a specified amount of skin friction to enforce a desired change in tangential momentum flux on the surface. Note that all terms involving vector manipulations are geometric factors that may be calculated prior to beginning the simulation.

When surface dynamics are performed using floating point numbers, an alternative approach may be used to generate $\Gamma_{iOUT}(\alpha)$. According to this approach, the normal momentum is determined as:

$$P_n(\alpha) = n_\alpha \cdot P(\alpha).$$

From this, a tangential velocity is determined as:

$$u_t(\alpha) = (P(\alpha) - P_n(\alpha) n_\alpha)/\rho,$$

where $\rho$ is the density of the facet distribution:

$$\rho = \sum_i N_i(\alpha).$$

A temperature T of the facet distribution is then determined as:

$$T = \left[ \sum_i j N_i(\alpha) - \frac{1}{2} \rho u_t \cdot u_t \right] / 2\rho$$

where j equals 0, 1 or 2 and corresponds to the energy of the state i.

Instead of using collisions to determine the Boltzmann distribution, it is determined as:

$$N_{n-Bi}(\alpha) = \langle N \rangle_j^{(eq)} \left[ 1 + \frac{c_i \cdot u_t}{T} + \frac{1}{2} \left( \frac{c_i \cdot u_t}{T} \right)^2 - \frac{u_t \cdot u_t}{2T} + \frac{1}{6} \left( \frac{c_i \cdot u_t}{T} \right)^3 - \left( \frac{c_i \cdot u_t}{T} \right) \left( \frac{u_t \cdot u_t}{2T} \right) \right]$$

where $$\langle N \rangle_j^{(eq)}(j=0,1,2)$$

is the equilibrium isotropic state population at energy level j:

$$\langle N \rangle_0^{(eq)} = \frac{\rho}{d_o} [1 - 3T(1 - T)]$$

$$\langle N \rangle_1^{(eq)} = \frac{\rho}{12} T(2 - 3T)$$

$$\langle N \rangle_2^{(eq)} = \frac{\rho}{24} T(3T - 1),$$

and $d_0$ is the number of rest states (i.e., six).

As before, the difference between the incoming flux distribution and the Boltzmann distribution is determined as:

$$\Delta\Gamma_i(\alpha) = \Gamma_{iIN}(\alpha) - N_{n-Bi}(\alpha) V_{i\alpha}.$$

The outgoing flux distribution then becomes:

$$\Gamma_{iOUT}(\alpha) = N_{n-Bi}(\alpha) V_{i\alpha} - \Delta\Gamma_i(\alpha) + K_f(n_\alpha \cdot c_i)[N_{n-Bi^*}(\alpha) - N_{n-Bi}(\alpha)] V_{i\alpha},$$

which corresponds to the first two lines of the outgoing flux distribution determined by the previous technique but does not require the correction for anomalous tangential flux.

Using either approach, the resulting flux-distributions satisfy all of the momentum flux conditions, namely:

$$\sum_{i, c_i \cdot n_\alpha > 0} c_i \Gamma_{i\alpha OUT} - \sum_{i, c_i \cdot n_\alpha < 0} c_i \Gamma_{i\alpha IN} = p_\alpha n_\alpha A_\alpha - K_f p_\alpha u_\alpha A_\alpha,$$

where $P_\alpha$ a is the equilibrium pressure at the facet $F_\alpha$ and is based on the averaged density and temperature values of the voxels that provide particles to the facet, and $u_\alpha$ is the average velocity at the facet.

To ensure that the mass and energy boundary conditions are met, the difference between the input energy and the output energy is measured for each energy level j as:

$$\Delta\Gamma_{\alpha mj} = \sum_{i, c_{ji} \cdot n_\alpha < 0} \Gamma_{\alpha jiIN} - \sum_{i, c_{ji} \cdot n_\alpha > 0} \Gamma_{\alpha jiOUT}$$

where the index j denotes the energy of the state i. This energy difference is then used to generate a difference term:

$$\delta\Gamma_{\alpha ji} = V_{i\alpha} \Delta\Gamma_{\alpha mj} / \sum_{i, c_{ji} \cdot n_\alpha < 0} V_{i\alpha}$$

for $c_{ji} \cdot n_\alpha > 0$. This difference term is used to modify the outgoing flux so that the flux becomes:

$$\Gamma_{\alpha jiOUTf} = \Gamma_{\alpha jiOUT} + \delta\Gamma_{\alpha ji}$$

for $c_{ji} \cdot n_\alpha > 0$. This operation corrects the mass and energy flux while leaving the tangential momentum flux unaltered. This adjustment is small if the flow is approximately uniform in the neighborhood of the facet and near equilibrium. The resulting normal momentum flux, after the adjustment, is slightly altered to a value that is the equilibrium pressure based on the neighborhood mean properties plus a correction due to the non-uniformity or non-equilibrium properties of the neighborhood.

Referring again to FIG. 1, particles are moved between voxels along the three-dimensional rectilinear lattice (step 114). This voxel to voxel movement is the only movement operation performed on voxels that do not interact with the facets (i.e., voxels that are not located near a surface). In typical simulations, voxels that are not located near enough to a surface to interact with the surface constitute a large majority of the voxels.

Each of the separate states represents particles moving along the lattice with integer speeds in each of the four dimensions: x, y, z and w. The integer speeds include: 0, ±1, and ±2. The sign of the speed indicates the direction in which a particle is moving along the corresponding axis. These linear speeds support simulation of particles with energy levels ranging from zero to four. Only energy levels zero to two are needed for subsonic flow simulations, while all five are needed for transonic flow simulations.

For voxels that do not interact with a surface, the move operation is computationally quite simple. The entire population of a state is moved from its current voxel to its destination voxel during every time increment. At the same time, the particles of the destination voxel are moved from that voxel to their own destination voxels. For example, an energy level 1 particle that is moving in the +1x and +1y direction (1, 1, 0, 0) is moved from its current voxel to one that is +1 over in the x direction and +1 up in the y direction. The particle ends up at its destination voxel with the same state it had before the move (1,1,0,0). Interactions within the voxel will likely change the particle count for that state based on local interactions with other particles and surfaces. If not, the particle will continue to move along the lattice at the same speed and direction.

It should be noted here that particles in the stopped states (energy level zero) do not get moved. In addition, the particles only get moved in three dimensions. Non-zero values in the w dimension of a state do not affect the determination of a lattice site to which the state's particles are to be moved. For example, an energy level one particle with a $-1z$ and a $+1w$ speed $(0,0,-1,1)$ and an energy level one particle with a $-1z$ and a $-1w$ $(0,0,-1,-1)$ speed would both move to a site that is $-1$ away in the z dimension. There are also two energy level two states that do not get moved at all: $(0,0,0,2)$ and $(0,0,0,-2)$.

Figure 7:
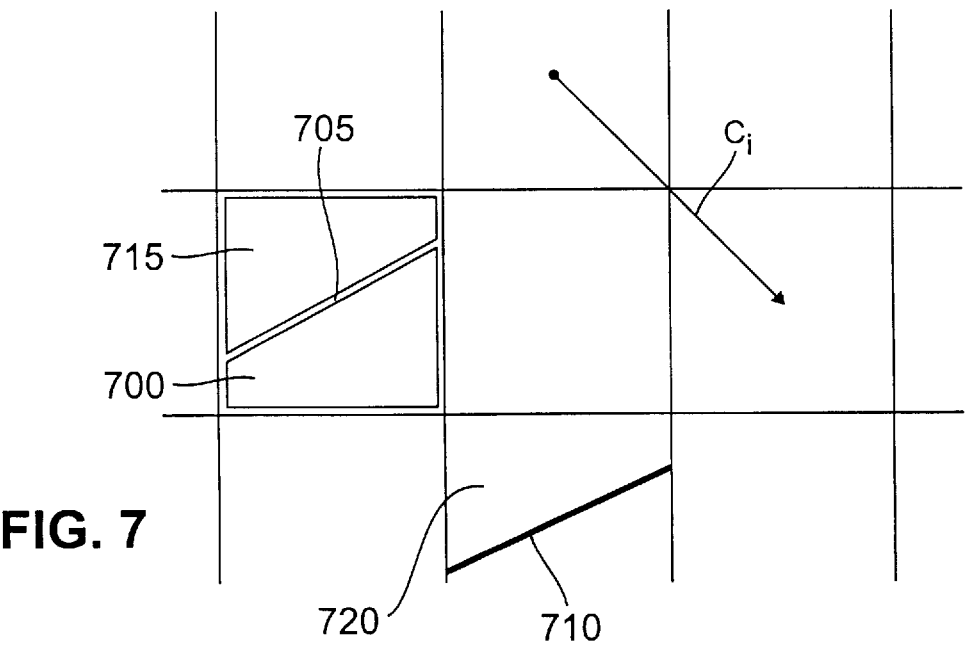
FIG. 7 illustrates movement of particles from a voxel to a surface.

The move operation becomes slightly more complicated for voxels that interact with one or more surfaces. As noted above, $V_{i\alpha}(x)$ and $P_f(x)$ may have non-integer values. This can result in one or more fractional particles being transferred to a facet. Transfer of such fractional particles to a facet results in fractional particles remaining in the voxels. These fractional particles are transferred to a voxel occupied by the facet. For example, referring to FIG. 7, when a portion 700 of the state i particles for a voxel 705 is moved to a facet 710 (step 108), the remaining portion 715 is moved to a voxel 720 in which the facet 710 is located and from which particles of state i are directed to the facet 710. Thus, if the state population equalled 25 and $V_{i\alpha}(x)$ equalled 0.25 (i.e., a quarter of the voxel intersects the parallelepiped $G_{i\alpha}$), then 6.25 particles would be moved to the facet $F_\alpha$ and 18.75 particles would be moved to the voxel occupied by the facet $F_\alpha$. Because multiple facets could intersect a single voxel, the number of state i particles transferred to a voxel N(f) occupied by one or more facets is:

$$N_i(f) = N_i(x)\left(1 - \Sigma_\alpha V_{i\alpha}(x)\right)$$

where N(x) is the source voxel. Because $N_i(f)$ may be a real number, $N_i(f)$ is temporarily stored in a buffer as a floating point number or a scaled integer until the advection stage is completed.

To store $N_i(f)$ as a scaled integer, $N_i(f)$ is determined as:

$$N_i(f) = \text{floor}\left[\left(N_{si}(x)\left(\text{scale} - \Sigma_\alpha V_{si\alpha}(x)\right) + \text{rand}\right)/\text{scale}\right]$$

where scale is a constant having a value of $2^{16}$ and $N_{si}(x)$ and $V_{si\alpha}(x)$ are, respectively, $N_i(x)$ and $V_{i\alpha}(x)$ multiplied by scale. The random number rand takes on values between zero and one prior to scaling, and is then scaled up by scale to values between 0 and $2^{16}-1$. The operator floor then produces an integer value. In particular, floor returns the largest integer that is less than or equal to its argument. For example, floor(2.3) equals 2 and floor(−2.3) equals −3.

Next, the outgoing particles from each facet are scattered to the voxels (step 116). Essentially, this step is the reverse of the gather step by which particles were moved from the voxels to the facets. The number of state i particles that move from a facet $F_\alpha$ to a voxel N(x) is:

$$N_{\alpha iF \to V} = \frac{1}{P_f(x)} V_{\alpha i}(x)\Gamma_{\alpha iOUT}/V_{\alpha i},$$

where $P_f(x)$ accounts for the volume reduction of partial voxels. From this, for each state i, the total number of particles directed from the facets to a voxel $N_{(x)}$ is:

$$N_{iF \to V} = \frac{1}{P_f(x)} \Sigma_\alpha V_{\alpha i}(x)\Gamma_{\alpha iOUT}/V_{\alpha i}.$$

To maintain the entries of the state vectors for the voxels as integers (and to convert non-integer entries back to integer form), the entries are rounded to integer values:

$$N_i(x, t_s+) = \text{floor}[(\text{scale}(N_i(x, t_s-)+N_{iF \to V}(x))+\text{rand})/\text{scale}]$$

where $t_{s-}$ is the time just before the scatter step, $t_s+$ is the time just after the scatter step, and $N_i(x, t_{s-})$ is a floating point number. The random number rand takes on values between zero and one prior to scaling, and is then scaled up by scale to values between 0 and $2^{16}-1$. Because the values are scaled up by scale, the division by scale is merely a matter of shifting the result of the multiplication and addition operations.

After scattering particles from the facets to the voxels, combining them with particles that have advected in from surrounding voxels, and integerizing the result, it is possible that certain directions in certain voxels may either underflow (become negative) or overflow (exceed 255). This would result in either a gain or loss in mass, momentum and energy after these quantities are truncated to fit in the allowed range of values from 0 to 255. To protect against such occurrences, the mass, momentum and energy that are out of bounds are accumulated prior to truncation of the offending state. For the energy to which the state belongs, an amount of mass equal to the value gained (due to underflow) or lost (due to overflow) is added back to randomly (or sequentially) selected states having the same energy and that are not themselves subject to overflow or underflow. The additional momentum resulting from this addition of mass and energy is accumulated and added to the momentum from the truncation. By only adding mass to the same energy states, both mass and energy are corrected when the mass counter reaches zero. Finally, the momentum is corrected using pushing/pulling techniques until the momentum accumulator is returned to zero.

Finally, fluid dynamics are performed (step 118). This step may be referred to as microdynamics or intravoxel operations. Similarly, the advection procedure may be referred to as intervoxel operations. The microdynamics operations described below may also be used to collide particles at a facet to produce a Boltzmann distribution.

The microdynamics operations simulate the set of physical interactions that occur within a voxel by sequentially applying a series of binary, trinary, or "n"ary interaction rules (also referred to as collision rules) to the state vector of a voxel during each time increment. For example, in the system described herein, there are 276 collision rules, each of which is implemented in a separate collision stage. Since the collision rules are applied sequentially, the result of their application has a complex nonlinear dependence on the initial state values that cannot be written simply in terms of those values. While the collision rules can be implemented as binary, trinary, or "n"ary collision events, for simplicity and ease of understanding the following discussion will refer primarily to binary collision events.

There are two basic types of collisions: non-energy exchanging "self" collisions and energy exchanging collisions. Self collisions allow for particles to collide with each other, thus changing their velocity. Because the state occupied by a particle determines the particle's velocity, a change in a particle's velocity is accomplished by moving that particle into a different state. A binary collision rule describes a self collision with reference to two input states and two output states, and simulates the collision of one or more particles from each of the input states by moving the particles to the output states. Because the collision rules are bi-directional, the input and output states are determined at the time the collision takes place depending on the states' populations.

Energy exchanging collisions differ from self collisions in that the two outgoing particles are at different energy levels than the two incoming particles. For subsonic flows there are only three energy levels: zero (stopped), one and two. To conserve energy, the only possible energy exchanging collisions occur when one pair includes two energy level one particles and the other pair includes an energy level two particle and a stopped particle. Energy exchanging collisions do not happen at the same rate in both directions. Rather, they happen at a forward rate from the energy level one states and a backward rate from the energy two and stopped states. As will be discussed in more detail below, these collision rates are dependent on the temperature of the system.

Each collision rule, whether directed to self or energy exchanging collisions, operates on a subset of the states of the state vector for a single voxel or facet and simulates the net effect of collisions between particles in those states. For example, a binary collision rule operates on four states (i, j, k, l) and simulates the net effect of collisions between particles in the first two states (i, j) and collisions between particles in the second two states (k, l). Because a collision between a pair of particles in the first two states results in the velocities of those particles changing to the velocities corresponding to the second two states, and vice versa, a binary collision rule can be expressed as:

$$N_{scatt} = C(N_i(t), N_j(t), N_k(t), N_l(t))$$
$$N_i(t + \epsilon) = N_i(t) - N_{scatt}$$
$$N_j(t + \epsilon) = N_j(t) - N_{scatt}$$
$$N_k(t + \epsilon) = N_k(t) + N_{scatt}$$
$$N_l(t + \epsilon) = N_l(t) + N_{scatt}$$

where $\epsilon$ denotes the physically infinitesimal time required to perform the collision rule. Similarly, a trinary collision rule can be expressed as:

$$N_{scatt} = C(N_i(t), N_j(t), N_k(t), N_l(t), N_m(t), N_n(t))$$
$$N_i(t + \epsilon) = N_i(t) - N_{scatt}$$
$$N_j(t + \epsilon) = N_j(t) - N_{scatt}$$
$$N_k(t + \epsilon) = N_k(t) - N_{scatt}$$
$$N_l(t + \epsilon) = N_l(t) + N_{scatt}$$
$$N_m(t + \epsilon) = N_m(t) + N_{scatt}$$
$$N_n(t + \epsilon) = N_n(t) + N_{scatt}.$$

It should be appreciated that a state change resulting from application of a collision rule actually reflects a net state change. For example, when application of a collision rule results in four particles from each of states i and j moving to each of states k and l, this movement might actually represent collisions that resulted in, for example, fifty six particles from each of states i and j moving to each of states k and l, and fifty two particles from each of states k and l moving to each of states i and j.

To accurately simulate physical systems, each collision rule must conserve mass, momentum and energy. Because the rules simply move particles from one state to another, and do not create or destroy particles, they necessarily conserve mass. To ensure that a rule conserves momentum, the states affected by the rule are selected so that:

$$c_i + c_j = c_k + c_l$$

Similarly, to ensure that a rule conserves energy, the states affected by the rule are selected so that:

$$c_i^2 + c_j^2 = c_k^2 + c_l^2$$

Thus, the states i, j, k, and l are selected for each rule so that a pair of particles from states i and j has the same total momentum and energy as a pair of particles from states k and l. Because the incoming and outgoing pairs of states must always conserve mass, momentum and energy, not all possible quartets within the 54 states correspond to a "legal" collision rule.

For a particular collision rule, $N_{scatt}$ is determined by applying a collision operator to the states affected by the rule. The arithmetic/computational form of the collision operator determines the practicality of implementing the operator in a simulation system. The statistical properties of the collision operator determine the extent to which accurate behavior can be achieved during a simulation.

The preferred collision operator is one for which $N_{scatt}$ approaches zero as the number of particles in each state affected by a rule approaches its Boltzmann equilibrium value. For binary collisions, the preferred operator is the "multilinear rule", which has the following form:

$$N_{scatt} = A_j [R_f * N_i * N_j - R_b * N_k * N_l]$$

where $A_j$ is a collision coefficient and $R_f$ and $R_b$ are the forward and backward collision rates for energy exchanging collisions. The coefficients $A_j$ depend only on local temperature and density, while $R_f$ and $R_b$ depend only on local temperature. Since temperature and density do not change due to collisions, $A_j$, $R_f$ and $R_b$ are constants for a particular time increment, and can be determined prior to all collisions.

The value of $A_j$ varies for each type of collision (self collisions between particles at energy level one, self collisions between particles at energy level two, and energy exchanging collisions) as shown below. If j=1, 2 or $\epsilon$ represents, respectively, self collisions at energy levels one or two, and energy exchanging collisions, then:

$$A_j = \frac{1}{4 <N>_\alpha^{(eq)}}, j = 1,2;$$

$$A_\epsilon = \frac{1}{2R_F <N>_1^{(eq)} + R_b(<N>_0^{(eq)} + <N>_2^{(eq)})}$$

where $$<N>_j^{(eq)} (j=0,1,2)$$

is the equilibrium isotropic state population at energy level j, as described above.

For energy exchanging collisions, states i and j are the energy level one states and states k and l are the energy level two and rest states so that $R_f/R_b$ represents the rate of collisions from energy level one particles to energy level two and rest particles. $R_f/R_b$ is defined as:

$$\frac{R_f}{R_b} = \frac{6}{d_0} \frac{(3T-1)[1-3T(1-T)]}{T(2-3T)^2}$$

where $d_0$ is the number of stopped particle states and equals six in the described embodiment. The temperature of the fluid, however, is not necessarily constant over the length of a simulation, especially for simulations involving heat transfer, and $A_j$ and $R_f/R_b$ must be updated dynamically during the simulation to reflect changes in the local temperature. The temperature range supported for subsonic flows is between 1/3 and 2/3. For self collisions, $R_f/R_b$ equals one.

As an example of a self collision, the following initial state is proposed:

$c_i=(1,0,1,0)$, $N_i=25$,
$c_j=(1,0,-1,0)$, $N_j=40$,
$c_k=(1,0,0,1)$, $N_k=53$, and
$c_l=(1,0,0,-1)$, $M_l=20$.

As shown, i, j, k and l are selected so that the combined momentum of states i and j and of states k and l are two in the x dimension and zero in the y, z and w dimensions, and so that each state is an energy level one state. Assuming that the total density $\rho$ is 1656 and the temperature is 1/2, $A_l$ using the expression for $<N>_l^{(eq)}$ so that $<N>_l^{(eq)}$ equals $\rho/48$ and $A_l$, equals $12/\rho$ or $1/138$. For illustrative purposes, if the collision rule were applied using floating point numbers the resulting state populations would have the following values:

$N_i=25-(-0.43478)=25.43478$,
$N_j=40-(-0.43478)=40.43478$,
$N_k=53+(-0.43478)=52.56522$, and
$N_l=20+(-0.43478)=19.56522$.

These new values of $N_i$, $N_j$, $N_k$ and $N_l$ drive the equilibrium measure to zero:

$$(N_i^*N_j - N_k^*N_l) = (25.43478^*40.43478) - (52.56522^*19.56522)$$
$$= 1028.45 - 1028.45$$
$$= 0$$

A potential for overflow or underflow of a state's particle count exists in the collision operation described above. An overflow would result in a loss of mass, momentum and energy and would occur if the sum of the state population and $N_{scatt}$ exceeded 255. By contrast, an underflow would result in creation of mass, momentum and energy and would occur if the result of subtracting $N_{scatt}$ from the state population was less than zero. Because the conservation of mass, momentum and energy is paramount in the simulation environment, an exchange of particles is prevented if it would cause either an overflow or underflow in any of the states involved in the collision.

Due to hardware limitations, $N^{scatt}$ is maintained as an integer value. For non-energy exchanging collisions, $N^{scatt}$ is determined as:

$$N_{scatt}=\text{floor}[\underline{A}_{js}^*(N_i^*N_j-N_k^*N_l)+\text{rand}]/\text{scale}]$$

where $\underline{A}_{js}$ $A_j$ scaled by multiplication by a constant, scale, that has a value of $2^{16}$. The random number rand takes on values between zero and one prior to scaling, and is then scaled up by scale to values between 0 and $2^{16}-1$. For energy exchanging collisions, $N^{scatt}$ is determined as:

$$N_{scatt}=\text{floor}[(R_f'^*N_i^*N_j-R_b'^*N_k^*N_l)+\text{rand}]/\text{scale}]$$

where $R_f'$ and $R_b'$ are, respectively, $R_f$ and $R_b$ multiplied by $A_{es}$, which is $A_e$ multiplied by scale. Rand is employed to prevent the truncation that results from the floor operation from introducing statistical bias into the system. Use of rand ensures that this operation, which forces $N_{scatt}$ to take on integer values, will not statistically bias $N_{scatt}$ in a particular direction.

With this approach, the values of $N_i$, $N_j$, $N_k$ and $N_l$ for the example provided above would be set to (25, 40, 53, 20) with 56.522% probability and (26, 41, 52, 19) with 43.478% probability. Averaged over a large number of trials, the mean values for $N_i$, $N_j$, $N_k$ and $N_l$ would be (25.43478, 40.43478, 52.56522, 19.56522). Thus, though a single application of the rule does not necessarily drive the populations toward equilibrium, the statistical mean values of the populations over a large number of applications of the rule correspond to the equilibrium values for those populations.

The multilinear collision operator drives the simulated system to Boltzmann equilibrium. This means that repeated application of the collision rules drives the system to an equilibrium value where, for a given set of macroscopic conditions, the individual state populations, $N_i$, take on known values as determined by the Boltzmann distribution:

$$N_i = r_i\exp\left(\alpha m + \gamma mc_i + \beta \frac{1}{2} mc_i^2\right)$$

where the factors in the exponent represent the conserved invariants of mass (m), momentum ($mc_i$) and energy ($mc_i^2$), it is assumed that no additional ("spurious") invariants occur, and $r_i$ represents a weighting factor generated from $R_f$ and $R_b$. Attainment of this distribution after each application of the collision rules will result in hydrodynamic behavior to some accuracy.

A simple way to derive this equilibrium is to assume that all collisions have occurred and have driven the interacting states to their individual equilibria. Thus, for a binary collision rule, the equilibrium is:

$$R_f^*N_i^*N_j = R_b^*N_k^*N_l$$

and, for the multilinear rule, $N_{scatt}$ equals zero. Taking logarithms of both sides in the preceding equation implies:

$$\ln r_i^{-1}N_i + \ln r_j^{-1}N_j = \ln r_k^{-1}N_k + \ln r_1^{-1}N_1$$

where $$r_i^{-1}r_j^{-1}=R_f$$

and $$r_k^{-1}r_l^{-1}=R_b.$$

This equation now must be satisfied for all pairs of pairs, (or pairs of trios, etc.) that are allowed under the collision rules. To satisfy the equation, $\ln r_i^{-1}N_i$ must be a sum of summational invariants of the collision process (i.e. quantities whose sum over particles are conserved) in the following form:

$$\ln r_i^{-1}N_i = \sum_\alpha A_\alpha I_i^\alpha$$

where $I_i^\alpha$ is the $\alpha$th invariant associated with state i, (e.g., a component of the momentum, $m_ic_i$, in the equation for $N_i$ above), and $A_\alpha$ are the coefficients associated with their corresponding invariants (e.g., $\alpha$, $\beta$ and $\gamma$ in the equation for $N_i$ above). As long as the mass, momentum and energy are the only conserved quantities (i.e., there are no spurious invariants), then the Boltzmann distribution results from this equation.

Figure 10:
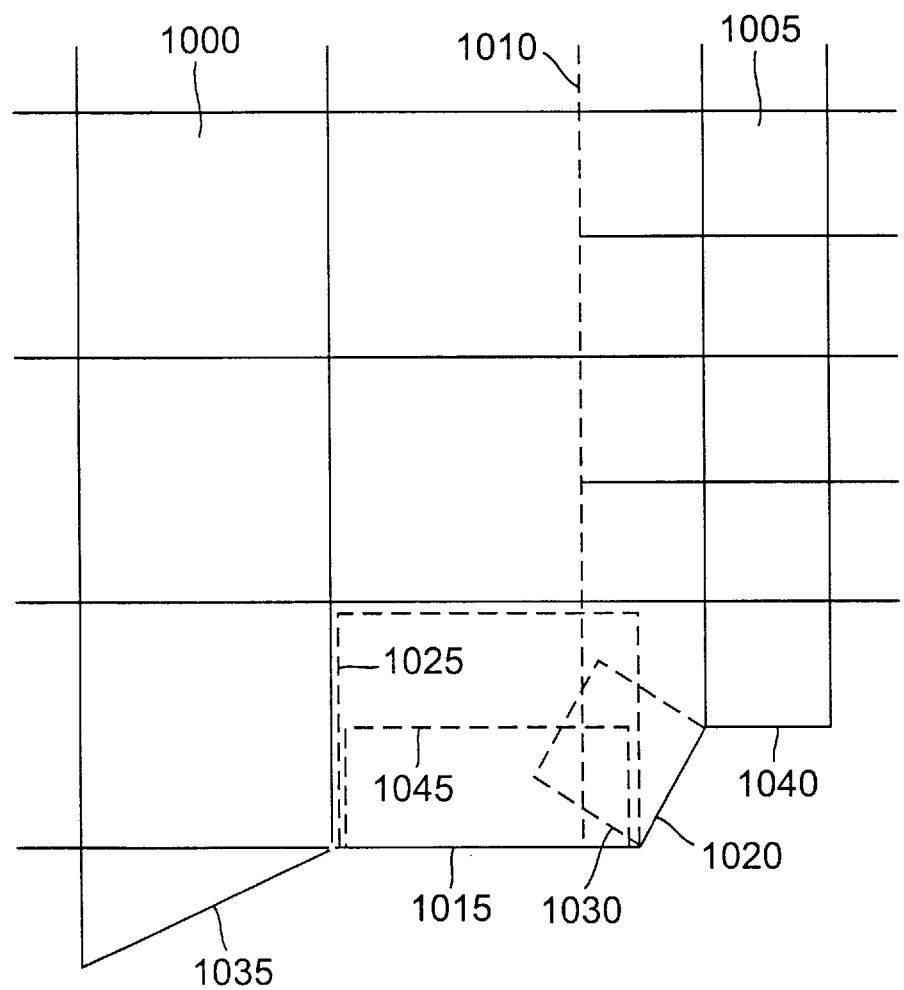
FIG. 10 illustrates an interface between voxels of different sizes.

Referring to FIG. 10, variable resolution (as illustrated in FIGS. 4 and 5 and discussed above) employs voxels of different sizes, hereinafter referred to as coarse voxels 1000 and fine voxels 1005. (The following discussion refers to voxels having two different sizes; it should be appreciated that the techniques described may be applied to three or more different sizes of voxels to provide additional levels of resolution.) The interface between regions of coarse and fine voxels is referred to as a variable resolution (VR) interface 1010.

When variable resolution is employed at or near a surface, facets may interact with voxels on both sides of the VR interface. These facets are classified as VR interface facets 1015 ($F_{\alpha IC}$) or VR fine facets 1020 ($F_{\alpha IF}$). A VR interface facet 1015 is a facet positioned on the coarse side of the VR interface and having a coarse parallelepiped 1025 extending into a fine voxel. (A coarse parallelepiped is one for which $c_i$ is dimensioned according to the dimensions of a coarse voxel, while a fine parallelepiped is one for which $c_i$ is dimensioned according to the dimensions of a fine voxel.) A VR fine facet 1020 is a facet positioned on the fine side of the VR interface and having a fine parallelepiped 1030 extending into a coarse voxel. Processing related to interface facets may also involve interactions with coarse facets 1035 ($F_{\alpha C}$) and fine facets 1040 ($F_{\alpha F}$).

For both types of VR facets, surface dynamics are performed at the fine scale, and operate as described above. However, VR facets differ from other facets with respect to the way in which particles advect to and from the VR facets.

Figure 11:
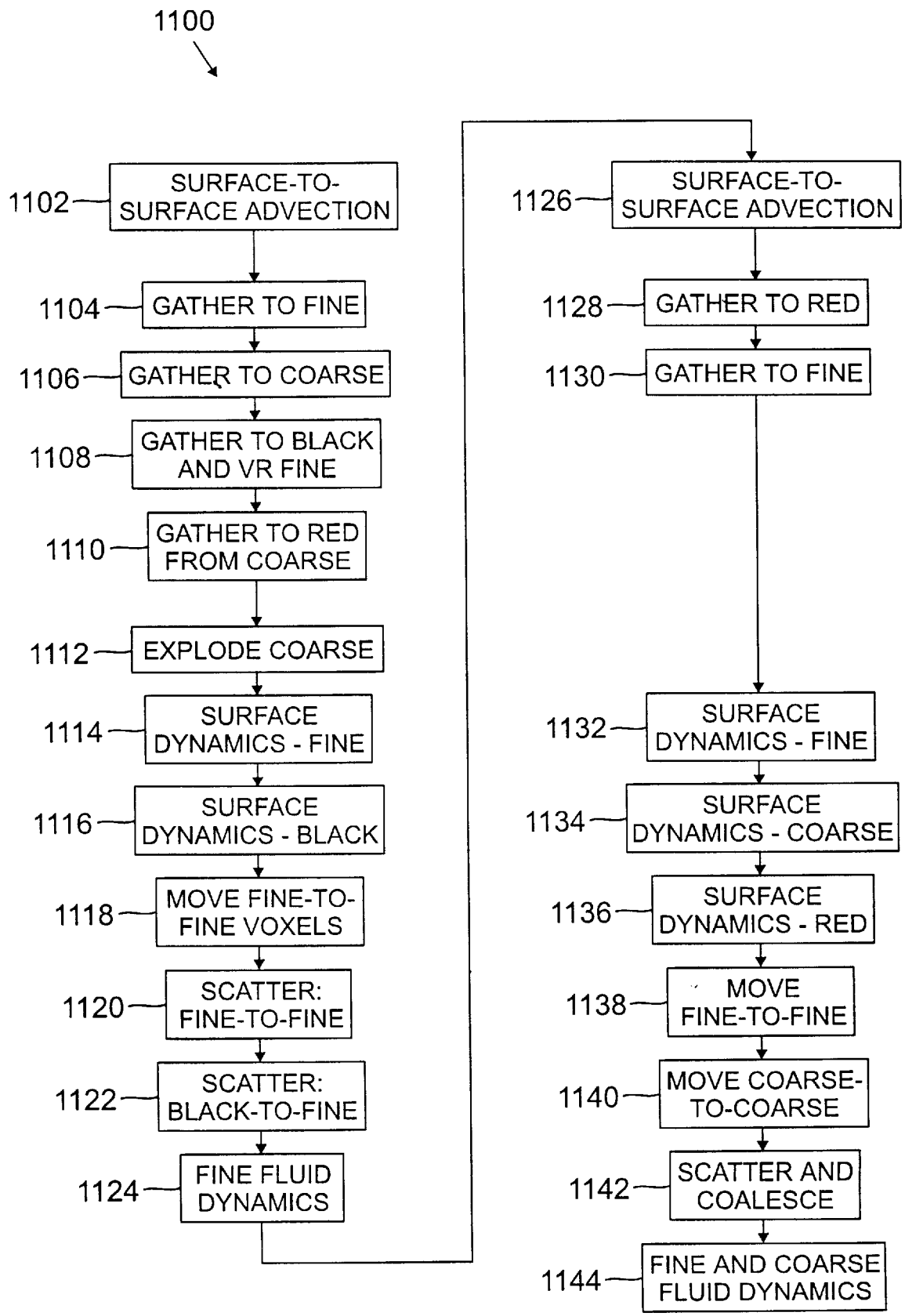
FIG. 11 is a flow chart of a procedure for simulating interactions with facets under variable resolution conditions.

Interactions with VR facets are handled using a variable resolution procedure 1100 illustrated in FIG. 11. Most steps of this procedure are carried out using the comparable steps discussed above for interactions with non-VR facets. The procedure 1100 is performed during a coarse time step (i.e., a time period corresponding to a coarse voxel) that includes two phases that each correspond to a fine time step. The facet surface dynamics are performed during each fine time step. For this reason, a VR interface facet $F_{\alpha IC}$ is considered as two identically sized and oriented fine facets that are referred to, respectively, as a black facet $F_{\alpha ICb}$ and a red facet $F_{\alpha ICr}$. The black facet $F_{\alpha ICb}$ is associated with the first fine time step within a coarse time step while the red facet $F_{\alpha ICr}$ is associated with the second fine time step within a coarse time step.

Initially, particles are moved (advected) between facets by a first surface-to-surface advection stage (step 1102). Particles are moved from black facets $F_{\alpha ICb}$ to coarse facets $F_{\beta C}$ with a weighting factor of $V_{-\alpha\beta}$ that corresponds to the volume of the unblocked portion of the coarse parallelepiped (FIG. 10, 1025) that extends from a facet $F_\alpha$ and that lies behind a facet $F_\beta$ less the unblocked portion of the fine parallelepiped (FIG. 10, 1045) that extends from the facet $F_\alpha$ and that lies behind the facet $F_\beta$. The magnitude of $c_i$ for a fine voxel is one half the magnitude of $c_i$ for a coarse voxel. As discussed above, the volume of a parallelepiped for a facet $F_\alpha$ is defined as:

$$V_{i\alpha} = |c_i \cdot n_\alpha| A_\alpha$$

Accordingly, because the surface area $A_\alpha$ of a facet does not change between coarse and fine parallelepipeds, and because the unit normal $n_\alpha$ always has a magnitude of one, the volume of a fine parallelepiped corresponding to a facet is one half the volume of the corresponding coarse parallelepiped for the facet.

Particles are moved from coarse facets $F_{\alpha C}$ to black facets $F_{\beta ICb}$ with a weighting factor of $V_{\alpha\beta}$ that corresponds to the volume of the unblocked portion of the fine parallelepiped that extends from a facet $F_\alpha$ and that lies behind a facet $F_\beta$.

Particles are moved from red facets $F_{\alpha ICr}$ to coarse facets $F_{\beta C}$ with a weighting factor of $V_{\alpha\beta}$, and from coarse facets $F_{\alpha C}$ to red facets $F_{\beta ICr}$ with a weighting factor of $V_{-\alpha\beta}$.

Particles are moved from red facets $F_{\alpha ICr}$ to black facets $F_{\beta ICb}$ with a weighting factor $V_{\alpha\beta}$. In this stage, black-to-red advections do not occur. In addition, because the black and red facets represent consecutive time steps, black-to-black advections (or red-to-red advections) never occur. For similar reasons, particles in this stage are moved from red facets $F_{\alpha ICr}$ to fine facets $F_{\beta IF}$ or $F_{\beta F}$ with a weighting factor $V_{\alpha\beta}$, and from fine facets $F_{\alpha IF}$ or $F_{\alpha F}$ to black facets $F_{\alpha ICb}$ with the same weighting factor.

Finally, particles are moved from fine facets $F_{\alpha IF}$ or $F_{\alpha F}$ other fine facets $F_{\beta IF}$ or $F_{\beta F}$ with the same weighting factor and from coarse facets $F_{\alpha C}$ to other coarse facets $F_C$ with a weighting factor $V_{C\alpha\beta}$ that corresponds to the volume of the unblocked portion of the coarse parallelepiped that extends from a facet $F_\alpha$ and that lies behind a facet $F_\beta$.

After particles are advected between surfaces, particles are gathered from the voxels in a first gather stage (steps 1104–1110). Particles are gathered for fine facets $F_{\alpha F}$ from fine voxels using fine parallelepipeds (step 1104), and for coarse facets $F_{\alpha C}$ from coarse voxels using coarse parallelepipeds (step 1106). Particles are then gathered for black facets $F_{\alpha IRb}$ and for VR fine facets $F_{\alpha IF}$ from both coarse and fine voxels using fine parallelepipeds (step 1108). Finally, particles are gathered for red facets $F_{\alpha IRr}$ from coarse voxels using the differences between coarse parallelepipeds and fine paralllelepipeds (step 1110).

Next, coarse voxels that interact with fine voxels or VR facets are exploded into a collection of fine voxels (step 1112). The states of a coarse voxel that will transmit particles to a fine voxel within a single coarse time step are exploded. For example, the appropriate states of a coarse voxel that is not intersected by a facet are exploded into eight fine voxels oriented like the microblock of FIG. 2. The appropriate states of coarse voxel that is intersected by one or more facets are exploded into a collection of complete and/or partial fine voxels corresponding to the portion of the coarse voxel that is not intersected by any facets. The particle densities $N_i(x)$ for a coarse voxel and the fine voxels resulting from the explosion thereof are equal, but the fine voxels may have fractional factors $P_f$ that differ from the fractional factor of the coarse voxel and from the fractional factors of the other fine voxels.

Thereafter, surface dynamics are performed for the fine facets $F_{\alpha IF}$ and $F_{\alpha F}$ (step 1114), and for the black facets $F_{\alpha ICb}$ (step 1116). Dynamics are performed using the procedure illustrated in FIG. 9 and discussed above.

Next, particles are moved between fine voxels (step 1118) including actual fine voxels and fine voxels resulting from the explosion of coarse voxels. Once the particles have been moved, particles are scattered from the fine facets $F_{\alpha IF}$ and $F_{\alpha F}$ to the fine voxels (step 1120).

Particles are also scattered from the black facets $F_{\alpha ICb}$ to the fine voxels (including the fine voxels that result from exploding a coarse voxel) (step 1122). Particles are scattered to a fine voxel if the voxel would have received particles at that time absent the presence of a surface. In particular, particles are scattered to a voxel $N(x)$ when the voxel is an actual fine voxel (as opposed to a fine voxel resulting from the explosion of a coarse voxel), when a voxel $N(x+c_i)$ that is one velocity unit beyond the voxel $N(x)$ is an actual fine voxel, or when the voxel $N(x+c_i)$ that is one velocity unit beyond the voxel $N(x)$ is a fine voxel resulting from the explosion of a coarse voxel.

Finally, the first fine time step is completed by performing fluid dynamics on the fine voxels (step 1124). The voxels for which fluid dynamics are performed do not include the fine voxels that result from exploding a coarse voxel (step 1112).

The procedure 1100 implements similar steps during the second fine time step. Initially, particles are moved between surfaces in a second surface-to-surface advection stage (step 1126). Particles are advected from black facets to red facets, from black facets to fine facets, from fine facets to red facets, and from fine facets to fine facets.

After particles are advected between surfaces particles are gathered from the voxels in a second gather stage (steps 1128–1130). Particles are gathered for red facets $F_{\alpha IRr}$ from fine voxels using fine parallelepipeds (step 1128). Particles also are gathered for fine facets $F_{\alpha F}$ and $F_{\alpha IF}$ from fine voxels using fine parallelepipeds (step 1130).

Thereafter, surface dynamics are performed for the fine facets $F_{\alpha fF}$ and $F_{\alpha F}$ (step 1132), for the coarse facets $F_{\alpha C}$ (step 1134), and for the red facets $F_{\alpha fCr}$ (step 1136) as discussed above.

Next, particles are moved between voxels using fine resolution (step 1138) so that particles are moved to and from fine voxels and fine voxels representative of coarse voxels. Particles are then moved between voxels using coarse resolution (step 1140) so that particles are moved to and from coarse voxels.

Next, in a combined step, particles are scattered from the facets to the voxels while the fine voxels that represent coarse voxels (i.e., the fine voxels resulting from exploding coarse voxels) are coalesced into coarse voxels (step 1142). In this combined step, particles are scattered from coarse facets to coarse voxels using coarse parallelepipeds, from fine facets to fine voxels using fine parallelepipeds, from red facets to fine or coarse voxels using fine parallelepipeds, and from black facets to coarse voxels using the differences between coarse parallelepipeds and find parallelepipeds. Finally, fluid dynamics are performed for the fine voxels and the coarse voxels (step 1144).

Figure 12:
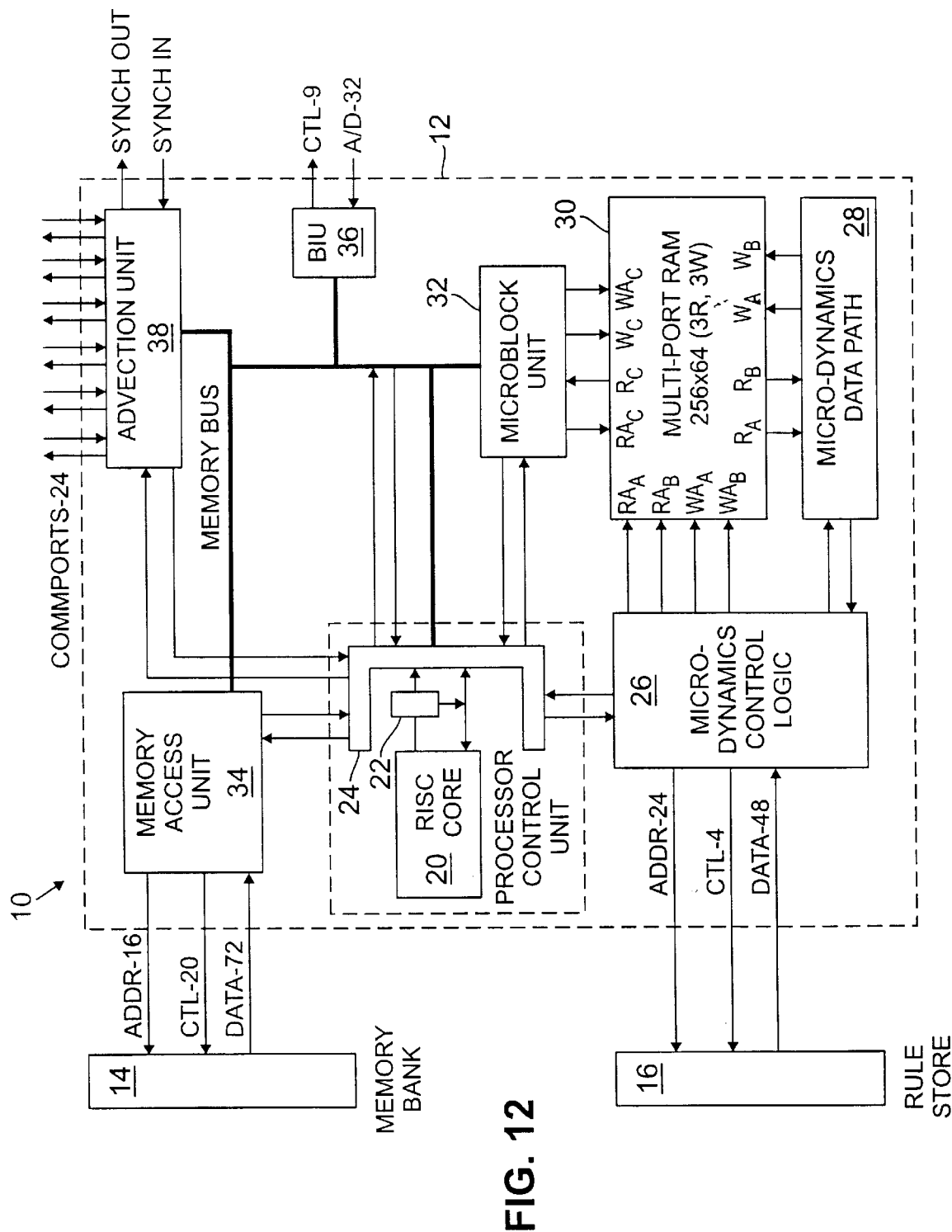
FIG. 12 is a block diagram of a functional unit of a physical process simulation system.

Referring to FIG. 12, the system described above can be implemented using a functional unit 10 that includes an application specific integrated circuit ("ASIC") 12 coupled to a memory bank 14 and a rule store 16. Though a system can be implemented using a single functional unit 10, ASIC 12 is designed so that hundreds, or even thousands, of functional units 10 can be connected together and operated in parallel for improved performance.

ASIC 12 includes a processor control unit ("PCU") 18 that itself includes a reduced instruction set computer ("RISC") processor 20, an instruction cache 22, and RISC interface logic 24. Processor control unit 18 acts as a central controller and issues vector-like commands to the various functional units. The functional units act as co-processors, taking an instruction from the processor control unit 18 and executing their own set of predefined sequences of instructions to complete the task. The instructions for processor control unit 18 are downloaded into memory bank 14 and are executed from there by processor control unit 18. These instructions control processor control unit 18 and cause it to issue commands to the other functional units in ASIC 12.

In addition to storing instructions for PCU 18, memory bank 14 stores particle states for each voxel assigned to the ASIC 12 along with the associated data structure and overhead information. The amount of storage provided by memory bank 14 dictates the amount of resolution that ASIC 12 can be assigned as its part of the total simulation volume. Memory bank 14 is constructed from a set of standard commodity synchronous DRAMs, which have been selected over standard asynchronous DRAMS due to their pipelined access mode and high data bandwidth capabilities.

A microdynamics unit ("MDU"), which includes microdynamics control logic 26 and a microdynamics data path 28, is the functional unit that is responsible for processing the particle dynamics. This includes particle interactions with each other as well as with surfaces. Microdynamics data path 28 includes the hardware necessary to perform the computations on the voxel data. Microdynamics control logic 26 sets up the data path to perform the correct operation and selects the proper data to be processed. Microdynamics control logic 26 sets up the data path and selects the data based on rule sets retrieved from rule store 16. Rule store 16 is constructed out of SRAMs to provide a fast access time and the ability to load the memory as the microdynamics rules are changed.

A multi-port RAM 30 acts as a register file for the particle states and the associated data that the microdynamics data path 28 is currently processing. RAM 30, which is a six-port static RAM, has 256 64-bit entries and supplies two read ports and two write ports to microdynamics data path 28. In addition, RAM 30 provides a read port and a write port to a microblock unit 32. This third set of ports is used for concurrent data movement between RAM 30 and a memory access unit 34 as well as for statistics. Memory access unit 34 is the central source and destination of particle data transfers within ASIC 12, and controls memory bank 14.

Figure 13:
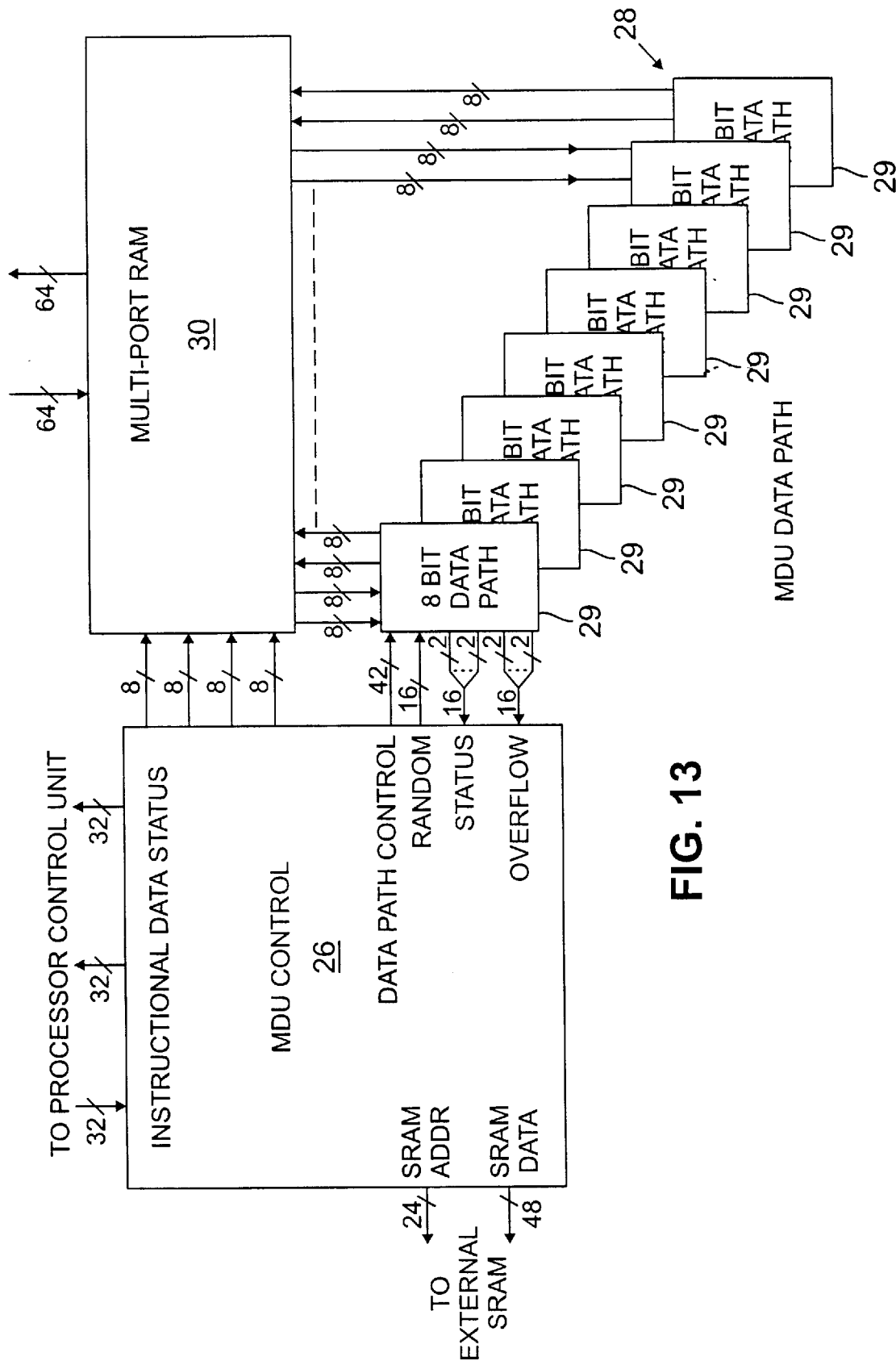
FIG. 13 is a block diagram of a microdynamics unit of the system of FIG. 12.
Figure 14:
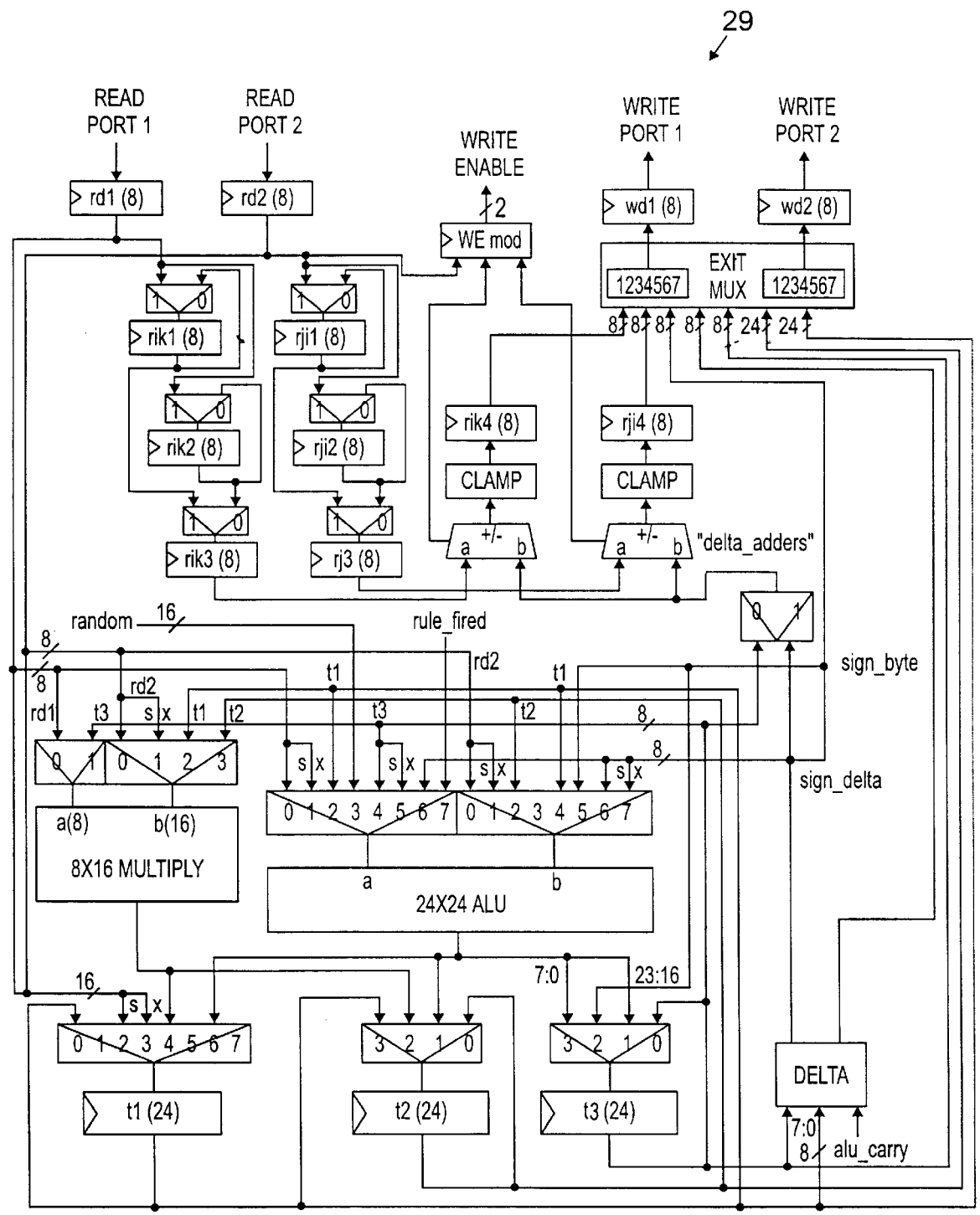
FIG. 14 is a block diagram of a single-voxel data path of the microdynamics unit of FIG. 13.

Referring also to FIGS. 13 and 14, microdynamics data path 28 processes eight voxels in parallel, by providing eight identical copies of the eight-bit data path 29 necessary to process one voxel. Microdynamics control logic 26 is constructed as a SIMD (single instruction multiple data) controller, where all eight sites are set up to execute the same operation on their independent voxel data.

A bus interface unit ("BIU") 36 connects ASIC 12 to external processors such as, for example, a general purpose "host" processor used for system control. (The host processor, or another external processor, would be used to implement the floating point operations employed when modelling the interactions of particles with faceted surfaces.) The main functions of BIU 36 are to provide a path for the system's host processor to provide initialization information to ASIC 12, and to send statistical information from ASIC 12 to the host processor. In addition, BIU 36 provides a path to memory access unit 34 so that memory bank 14 is accessible to the host processor.

An advection unit ("AU") 38 provides the data path and control to enables particles to advect (move) along the cubic lattice, including support for those particles that are moving to a destination voxel that is owned by another ASIC 12. To transmit particles to a voxel owned by another ASIC 12, AU 38 includes communications ports.

Microblock unit 32 is responsible for calculating statistics on the data being processed in the MDU. After the voxel data has been processed in the MDU, microblock unit 32 uses the voxel data to generate the statistics. The data is then sent back to memory bank 14 through memory access unit 34.

The RISC processor 20 is capable of doing the standard set of 32-bit integer arithmetic and logical operations. In effect, the RISC processor can be coded to execute a program in memory as any standard processor could.

A memory map has been established for ASIC 12 that essentially creates three segments in the processors 4 GB address space:

1) 2 GB (minus 8 MB) of direct access to the external memory bank controlled by the MAU.
2) 8 MB of on-ASIC memory mapped registers and instructions owned and decoded by the functional units.
3) 2 GB of off-chip host memory access connected through the BIU.

The logic in the PCU decodes the address issued by the RISC processor and determines where it should be sent. Local memory requests are sent to the MAU. Memory mapped register reads or writes which includes functional unit instructions are sent to the appropriate functional unit. Host memory references are sent to the BIU which will forward the requests to the host system.

There are four functional units that are capable of requesting memory transfers from the MAU: the processor control unit, the bus interface unit, the microblock unit, and the advection unit. The MAU arbitrates between the requests from these four units and allows single and multiple word transfers. The MAU maintains a DMA engine to support the burst transfers. Upon receiving a grant from the MAU, the unit connects to the MAU and drives or receives data until its transfer is complete.

The RISC processor initiates the transfer of most of the data packets between the various functional units and the MAU. The function units, or co-processors in this model, have no knowledge of system or ASIC level transactions. The units are given data and tasks to perform by the RISC engine and they process that data locally. For example, the processor instructs the microblock unit to fetch a specific block of data from the memory controlled by the MAU and place it into the multi-port RAM. The RISC engine then issues an instruction to the microdynamics unit to process that data. After the processing is complete, the RISC engine instructs the microblock unit to retrieve the block of data from the multi-port RAM and put it back in a specific location in memory.

In addition to the PCU initiated memory requests, there are 2 off-chip sources of MAU memory transfers: memory requests initiated by the host system via the BIU, and data received from other processors via the AU's communications ports.

The co-processor units are capable of processing routines that take from tens to hundreds to even thousands of cycles based on a single command from the RISC engine and a block of data held in local storage. This processing length allows the RISC engine enough free time to issue commands and check the status of the other units in addition to possibly doing some calculations itself to update the data structure or determine the segment to process next.

The RISC processor issues instructions to the functional units via memory mapped writes. The address of the write specifies the functional unit along with the opcode of the instruction for that functional unit. The 32-bits of data provided by the write are parameters of the opcode. Each opcode specifies how it interprets the data bus. Each functional unit can only handle one instruction at a time. If a unit is busy processing an instruction previously issued, any new instructions will be pended at the PCU. The RISC processor is also free to read registers and status in each of the functional units to determine the current state of the machine.

To off-load the RISC processor from complicated control loops required to issue memory mapped instructions, an instruction queue is provided in the PCU to queue up a number of instructions. The instruction at the head of the queue is dispatched to the appropriate functional unit as soon as that unit is free to take a new instruction. If the unit is busy, then the queue will not issue the instruction and will stall all subsequent instructions. This queuing mechanism allows the dependencies between the function units to be encoded in the ordering of the queued instructions. At any time, the processor is free to by-pass the instruction queue and issue instructions directly to and read information from the function units.

Other embodiments are within the following claims. For example, the viscosity of the simulation could be modified using the over-relaxation technique described by Traub et al. in "Viscosity Reduction in Physical Process Simulation", U.S. application Ser. No. 08/255,409, filed Jun. 8, 1994.

Viscosity is a measure of a fluid's resistance to a shear force (i.e., a force which acts parallel to the direction of fluid flow). In an actual fluid, viscosity results from interactions between neighboring particles in the fluid that cause the velocities of the particles to gravitate toward an average value. In a lattice system, viscosity results from interactions between particles positioned in specific voxels that cause the net velocity of the particles positioned in a voxel to gravitate toward the net velocity of the particles positioned in neighboring voxels. Because each voxel in a lattice system represents a region of simulated space that is substantially larger than the physical space that would be occupied by an actual particle, the viscosity resulting from interactions between voxels is substantially greater than that resulting from molecular particle interactions in real fluids (i.e., the "averaging" resulting from each voxel interaction affects a substantially larger region of space than that resulting from each molecular particle interaction).

Viscosity in a lattice system can be reduced by increasing the density of the lattice (i.e., by decreasing the quantity of simulated space that is represented by each voxel), and can also be reduced through use of over-relaxation. Viscosity, $v$, can be expressed in terms of $\omega$, the relaxation parameter:

$$v = T\left(\frac{1}{\omega} - \frac{1}{2}\right)$$

where T is the temperature of the fluid. Thus, for example, relative to a relaxation parameter of one ($v=T/2$), a relaxation parameter of 1.8 ($v=T/18$) will reduce the viscosity in the lattice by a factor of nine.

Use of over-relaxation effectively increases the density of the lattice. Use of over-relaxation therefore has a dramatic effect on the processing necessary to simulate a physical system with a particular resolution (or the resolution with which a particular processor can simulate a physical system). For example, a tenfold increase in the effective density of a three dimensional lattice reduces the processing required to simulate a physical system with the lattice to a particular level of resolution by a factor of almost ten thousand (i.e., ten cubed less the additional processing required to implement over-relaxation and multiplied by a tenfold decrease in the time required to simulate a fluid of a given velocity).

To change the viscosity of the simulated physical process, the computer system performs viscosity modification operations on the state vectors. These operations are typically performed after the microdynamics operations and apply a set of rules that are similar to, or the same as, the rules applied during the microdynamics operations. Where the same rules are applied, the rules modify the state vectors by a first amount during the microdynamics operations and a second amount during the viscosity modification operations, where the first amount is related to the second amount by a relaxation parameter. Because the rules used in the interaction operations conserve mass, momentum and energy, this approach ensures that these properties will be conserved during the viscosity modification operations.

When the second amount is determined by multiplying the first amount by a real number derived from the relaxation parameter, the result of the multiplication is truncated to ensure that the second amount is an integer value. To prevent the truncation operation from introducing statistical bias into the system, a random value between zero and one is added to the result of the multiplication prior to truncation.

The viscosity of the lattice system is reduced by using a relaxation parameter having a value greater than one and less than two. As the relaxation parameter approaches two, the viscosity of the simulated system approaches zero and the system becomes unstable. Viscosity, which is essentially a form of friction, tends to damp out fluctuations in the system. Thus, instability occurs when there is no viscosity because these fluctuations are allowed to spread unchecked through the system. It has been found that instability can generally be avoided by using a relaxation parameter that is less than or equal to 1.9.

What is claimed is:

1. A computer implemented method for simulating a physical process, comprising the steps of:

(1) storing in a memory state vectors for a plurality of voxels, the state vectors comprising a plurality of entries that correspond to particular momentum states of a plurality of possible momentum states at a voxel;

(2) storing in a memory a representation of at least one surface that is sized and oriented independently of the size and orientation of the voxels;

(3) performing interaction operations on the state vectors, the interaction operations modelling interactions between elements of different momentum states;

(4) performing surface interaction operations on the representation of the surface, the surface interaction operations modelling interactions between the surface and elements of at least one voxel near the surface; and (5) performing move operations on the state vectors to reflect movement of elements to new voxels.

2. A computer system for simulating a physical process, comprising:

(1) means for storing in a memory state vectors for a plurality of voxels, the state vectors comprising a plurality of entries that correspond to particular momentum states of a plurality of possible momentum states at a voxel;

(2) means for storing in a memory a representation of at least one surface that is sized and oriented independently of the size and orientation of the voxels;

(3) means for performing interaction operations on the state vectors, the interaction operations modelling interactions between elements of different momentum states;

(4) means for performing surface interaction operations on the representation of the surface, the surface interaction operations modelling interactions between the surface and elements of at least one voxel near the surface; and (5) means for performing move operations on the state vectors to reflect movement of elements to new voxels.

3. The subject matter of claim 1 or 2, wherein an entry of a state vector represents a density of elements per unit volume in a particular momentum state of a voxel.

4. The subject matter of claim 3, wherein a state vector comprises a plurality of integers that represent a density of elements per unit volume in a particular momentum state and have more than two possible values.

5. The subject matter of claim 4, wherein the interaction operations are performed using integer values, and wherein the surface interaction operations are performed using values representative of real numbers.

6. The subject matter of claim 5, wherein the surface interaction operations are performed using floating point numbers.

7. The subject matter of claim 1 or 2, further comprising representing a voxel that is intersected by a surface as a partial voxel.

8. The subject matter of claim 1 or 2, wherein the representation of at least one surface comprises a plurality of facets that are sized and oriented independently of the size and orientation of the voxels and, in combination, represent at least one surface, and wherein the surface interaction operations model interactions between a facet and elements of at least one voxel near the facet.

9. The subject matter of claim 8, wherein the elements represent particles of a fluid and the facets represent at least one surface over which the fluid flows.

10. The subject matter of claim 8, wherein the surface interaction operations comprise:

gathering elements from a first set of at least one voxel that interacts with a facet, modelling interactions between the gathered elements and the facet to produce a set of surface interacted elements, and scattering the surface interacted elements to a second set of at least one voxel that interacts with the facet.

11. The subject matter of claim 10, wherein the first set of voxels is identical to the second set of voxels.

12. The subject matter of claim 10, further comprising storing, for a voxel that is occupied by a portion of at least one facet, a factor representing a portion of the voxel that is not occupied by any facet.

13. The subject matter of claim 12, wherein the factor for a voxel is considered when gathering elements from the voxel.

14. The subject matter of claim 10, wherein the first set of voxels includes at least one voxel that overlaps at least a portion of a region defined by a vector dot product of a vector representing a normal direction relative to the facet with a vector representing the velocity of a momentum state for which elements are being gathered.

15. The subject matter of claim 14, wherein a volume of the region equals the vector dot product multiplied by a surface area of the facet and the first set of voxels includes all voxels that at least partially overlap the volume.

16. The subject matter of claim 10, further comprising gathering elements from at least one other facet.

17. The subject matter of claim 10, wherein interactions between the gathered elements and the facet are modelled so that the set of surface interacted elements satisfies at least one boundary condition.

18. The subject matter of claim 17, wherein a boundary condition is satisfied when a difference between a combined momentum of the gathered elements that is tangential to the facet and a combined momentum of the surface interacted elements that is tangential to the facet is related to a degree of surface friction possessed by a surface represented by the facet.

19. The subject matter of claim 18, wherein an additional boundary condition is satisfied when a difference between a combined momentum of the gathered elements that is normal to the facet and a combined momentum of the surface interacted elements that is normal to the facet equals a pressure in a region defined by at least one voxel of the first set of voxels.

20. The subject matter of claim 19, wherein an additional boundary condition is satisfied when a combined mass of the gathered elements equals a combined mass of the surface interacted elements.

21. The subject matter of claim 20, wherein an additional boundary condition is satisfied when a combined energy of the gathered elements equals a combined energy of the surface interacted elements.

22. The subject matter of claim 17, wherein the facet represents a surface having no surface friction and a boundary condition is satisfied when a combined momentum of the gathered elements that is tangential to the facet equals a combined momentum of the surface interacted elements that is tangential to the facet.

23. The subject matter of claim 17, wherein a boundary condition is satisfied when a difference between a combined momentum of the gathered elements that is normal to the facet and a combined momentum of the surface interacted elements that is normal to the facet equals a pressure in a region defined by at least one voxel of the first set of voxels.

24. The subject matter of claim 17, wherein a boundary condition is satisfied when a combined mass of the gathered elements equals a combined mass of the surface interacted elements.

25. The subject matter of claim 17, wherein a boundary condition is satisfied when a combined energy of the gathered elements equals a combined energy of the surface interacted elements.

26. The subject matter of claim 10, wherein a state vector comprises a plurality of integers that represent particular momentum states and wherein the surface interaction operations are performed using values representative of real numbers.

27. The subject matter of claim 26, further comprising ensuring that the integer values of the state vectors do not overflow or underflow when the surface interacted elements are scattered to the second set of at least one voxel.

28. The subject matter of claim 27, further comprising conserving the mass, momentum and energy of a voxel while ensuring that the integer values of the state vector corresponding to the voxel do not overflow or underflow when the surface interacted elements are scattered to the second set of at least one voxel.

29. The subject matter of claim 1 or 2, wherein representations of two surfaces that are sized and oriented independently of the size and orientation of the voxels are stored in a memory.

30. The subject matter of claim 1 or 2, wherein state vectors for a plurality of voxels having different sizes are stored in memory and wherein the surface interaction operations account for interactions between a surface and at least two voxels having different sizes.

31. A computer implemented method for simulating a physical process, comprising the steps of:
  (1) storing in a memory state vectors for a plurality of voxels, the state vectors comprising a plurality of entries that correspond to particular momentum states of a plurality of possible momentum states at a voxel; and
  (2) performing operations on the state vectors, the operations modelling interactions between elements of different momentum states and movement of elements relative to the voxels, wherein at least some of the operations are performed using floating point numbers and at least some of the operations are performed using integer values.

32. A computer system for simulating a physical process, comprising:
  (1) means for storing in a memory state vectors for a plurality of voxels, the state vectors comprising a plurality of entries that correspond to particular momentum states of a plurality of possible momentum states at a voxel; and
  (2) means for performing operations on the state vectors, the operations modelling interactions between elements of different momentum states and movement of elements relative to the voxels, wherein at least some of the operations are performed using floating point numbers and at least some of the operations are performed using integer values.

33. The subject matter of claim 31 or 32, wherein a state vector comprises a plurality of integers that represent a density of elements per unit volume in a particular momentum state.

34. The subject matter of claim 31 or 32, further comprising storing in a memory a representation of at least one surface that is sized and oriented independently of the size and orientation of the voxels, wherein the operations performed using floating point numbers comprise operations that model interactions of the elements with the at least one surface.

35. The subject matter of claim 31 or 32, wherein transitions from floating point numbers to integer values are made in a way that preserves physical properties of the physical process.

* * * * *

UNITED STATES PATENT AND TRADEMARK OFFICE
CERTIFICATE OF CORRECTION

PATENT NO. : 5,848,260

DATED : DECEMBER 8, 1998

INVENTOR(S) : HUDONG CHEN; DAVID LAWRENCE HILL; JAMES HOCH; KIM MOLVIG; CHRISTOPHER M. TEIXEIRA; AND KENNETH R. TRAUB

It is certified that error appears in the above-identified patent and that said Letters Patent is hereby corrected as shown below:

Cover page [75] Inventors: "Lawerence Hill" should be --Lawrence Hill--.

Cover page [56] References Cited, OTHER PUBLICATIONS, the "Chen et al." reference, "Magnetohydordynamics" should be --Magnetohydrodynamics--.

Cover page [56] References Cited, OTHER PUBLICATIONS, the "Chopard et al." reference, "Pysics" should be --Physics--.

Cover page 2 [56] References Cited, OTHER PUBLICATIONS, the second "d'Humieres et al." reference, before "2(4)", insert --Europhys. Lett.,--.

Cover page 2 [56] References Cited, OTHER PUBLICATIONS, the third "d'Humieres et al." reference, "Numerial" should be --Numerical--.

Cover page 2 [56] References Cited, OTHER PUBLICATIONS, the "Kadanoff" reference, after "Levels", insert --,--.

Cover page 2 [56] References Cited, OTHER PUBLICATIONS, the first "Molvig et al." reference, "Pysics" should be --Physics--.

Column 4, line 42, "represents" should be --represent--.

Column 8, line 3, after "dimensions", insert --.--.

Column 14, line 10, after "$P_\alpha$", delete --a--.

UNITED STATES PATENT AND TRADEMARK OFFICE
CERTIFICATE OF CORRECTION

PATENT NO. : 5,848,260

DATED : DECEMBER 8, 1998

INVENTOR(S) : HUDONG CHEN; DAVID LAWRENCE HILL; JAMES HOCH; KIM MOLVIG; CHRISTOPHER M. TEIXEIRA; AND KENNETH R. TRAUB

It is certified that error appears in the above-identified patent and that said Letters Patent is hereby corrected as shown below:

Column 16, equation at line 9, before the second occurrence of "scale", delete "1".

Column 17, line 65, insert a period after the equation.

Column 18, line 1, insert a period after the equation.

Column 19, line 4, "$M_I=20$" should be --$N_I=20$--.

Column 19, line 11, after "$A_I$" delete ",".

Column 19, line 12, after "numbers", insert --,--.

Column 19, line 44, after "$\underline{A}_{js}$", insert --is--.

Column 21, line 41, insert a period after the equation.

Column 21, line 67, before "other", insert --to--.

Column 23, line 20, "find" should be --fine--.

UNITED STATES PATENT AND TRADEMARK OFFICE
CERTIFICATE OF CORRECTION

PATENT NO. : 5,848,260
DATED : December 8, 1998
INVENTOR(S) : Hudong Chen, et al It is certified that error appears in the above-identified patent and that said Letters Patent is hereby corrected as shown below:

Column 24, line 32, "enables" should be --enable--.

Signed and Sealed this

Twenty-fourth Day of April, 2001

Attest:

NICHOLAS P. GODICI

Attesting Officer     Acting Director of the United States Patent and Trademark Office